US005546503A

United States Patent [19]

Abe et al.

[11] Patent Number: 5,546,503
[45] Date of Patent: Aug. 13, 1996

[54] APPARATUS FOR CONFIGURING NEURAL NETWORK AND PATTERN RECOGNITION APPARATUS USING NEURAL NETWORK

[75] Inventors: Shigeo Abe, Katsuta; Masahiro Kayama, Hitachi; Hiroshi Takenaga, Ibaraki-ken; Yasuo Morooka, Hitachi; Junzo Kawakami, Mito; Masao Takatoo, Katsuta, all of Japan

[73] Assignee: Hitachi, Ltd., Tokyo, Japan

[21] Appl. No.: 744,263

[22] Filed: Aug. 13, 1991

[30] Foreign Application Priority Data

Nov. 9, 1990 [JP] Japan ................. 2-302440

[51] Int. Cl.[6] .............. G06K 9/00; G06F 15/46
[52] U.S. Cl. .................................. 395/23
[58] Field of Search ............... 395/23, 24

[56] References Cited

U.S. PATENT DOCUMENTS

| 5,033,006 | 7/1991 | Ishizuka ............... | 395/23 |
| 5,111,531 | 5/1992 | Grayson et al. ....... | 395/23 |
| 5,142,612 | 8/1992 | Skeirik ................. | 395/11 |
| 5,197,114 | 3/1993 | Skeirik ................. | 395/23 |

OTHER PUBLICATIONS

"Parallel Distributed Processing"(Learning Internal Representations by Error Propagation), Rumelhart, et al, vol. 1, MIT Press, Cambridge MA, 1986, pp. 318–362.

An Investigation of Neural Networks for F–16 Fault Diagnosis: 1. System Description; McDuff et al; Autotestcon: '89 Conference Record: The Systems Readiness Technology Conference; 25–28 Sep. 1989; pp. 351–357.

Integrating Neural Networks and Knowledge–Based Systems for Robotic Control; Handelman et al; Proc. 1989 IEEE Intr Conf on Robotics and Automation; 14–19 May 1989; pp. 1454–1460.

Integration of Knowledge–Based System and Neural Networks Techniques for Autonomous Learning Machines; Handleman et al; IJCNN; 18–22 Jun. 1989; pp. 1–683 to 1–688.

An Adaptive Feedforward Artificial Neural Network with the Applications to Multiple Criteria Decision Making; Zhou et al; 1990 IEEE Inter Conf on Systems, Man, and Cybernetics; 4–7 Nov. 1990; pp. 164–169.

*Primary Examiner*—Robert W. Downs
*Attorney, Agent, or Firm*—Antonelli, Terry, Stout & Kraus

[57] ABSTRACT

In a neural network having neurons connected in a multilayer, firstly, input signal sets are sequentially entered to statistically process the outputs of hidden neurons and determine the optimum number of hidden neurons. Secondly, while changing the input signal entered to each input neuron to the maximum change limit, the change of output values of the other input neurons are checked to thereby determine an unnecessary input neuron. Thirdly, the weights between input neurons and hidden neurons are set to be in correspondence with a hyperplane to enable pattern recognition.

20 Claims, 25 Drawing Sheets

F I G. 16
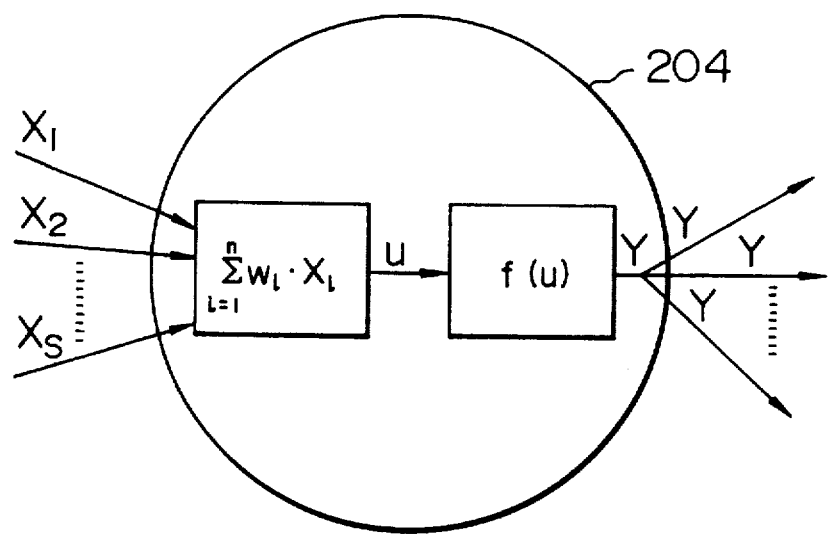
F I G. 17
| NO. | INPUT SIGNAL SET | | | | OUTPUT SIGNAL SET | | | |
|---|---|---|---|---|---|---|---|---|
| | $X_1$ | $X_2$ | ............ | $X_p$ | $T_1$ | $T_2$ | ............ | $T_q$ |
| 1 | 0.5 | 0.33 | ............ | 0.9 | 0.99 | 0.01 | ............ | 0.01 |
| 2 | 1 | 0.67 | ............ | 0.79 | 0.01 | 0.99 | ............ | 0.01 |
| ⋮ | ⋮ | ⋮ | | ⋮ | ⋮ | ⋮ | | ⋮ |
| N | 0 | 0.12 | ............ | 0.15 | 0.01 | 0.01 | ............ | 0.01 |

F I G. 24A
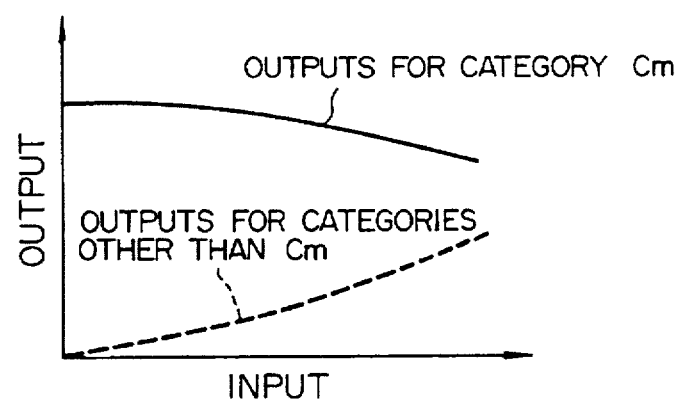
F I G. 24B
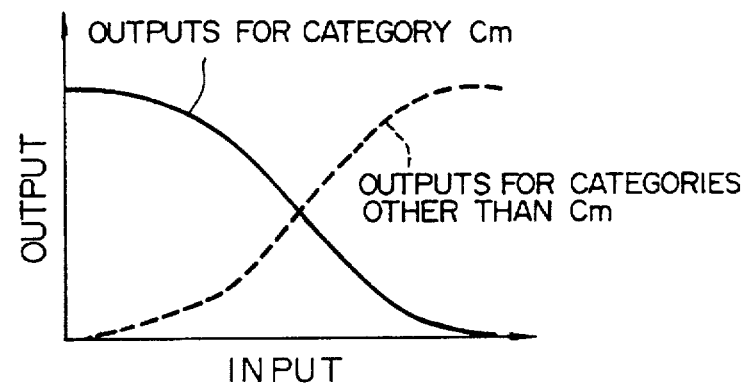

F I G. 25

| INPUT SIGNAL CATEGORY | $x_1$ | $x_2$ | ---------- | $x_i$ | ------------ | $x_p$ |
|---|---|---|---|---|---|---|
| $c_1$ | ○ | × |  | ○ |  | ○ |
| $c_2$ | ○ | ○ |  | ○ |  | × |
| ⋮ |  |  |  |  |  |  |
| $c_m$ | ○ | × |  | ○ |  | × |
| ⋮ |  |  |  |  |  |  |
| $c_n$ | × | × |  | ○ |  | ○ |

FIG. 32

| PARAMETER / LEARNING NUMBER | LEARNING ACCURACY | LEARNING DATA NUMBER | INITIAL WEIGHT VALUE | LEARNING CONSTANT | STABILIZATION CONSTANT |
|---|---|---|---|---|---|
| 5000 | 1% | 1500 | -0.5~0.5 | 0.8 | 0.2 |
| 10,000 | 0.5% | 4000 | -0.5~0.5 | 0.8 | 0.3 |
| 50,000 | 0.5% | 10000 | 0~0.4 | 0.7 | 0.2 |
| ---------- | ---------- | ---------- | ---------- | ---------- | ---------- |
| 1,000 | 3% | 500 | -0.5~0.5 | 0.8 | 0.1 |

APPARATUS FOR CONFIGURING NEURAL NETWORK AND PATTERN RECOGNITION APPARATUS USING NEURAL NETWORK

BACKGROUND OF THE INVENTION

The present invention relates to an apparatus for configuring a multi-layered neural network, and various application apparatuses using a multi-layered neural network, such as apparatuses for use in pattern recognition, anticipation, estimation, function approximation, and control.

A method used for pattern recognition, anticipation, estimation, function approximation, or control using a neural network is discussed in "Parallel Distributed Processing", Vol. 1, MIT Press, Cambridge, Mass., 1986, pp. 318 to 362.

A neural network will be described taking pattern recognition as an example. A neural network has neurons connected in a cascaded multi-layer manner. FIG. 2 shows an example of a three-layered neural network. In FIG. 2, reference numerals 1000 and 1001 represent input neurons, 1003 and 1004 represent hidden neurons, and 1002 and 1005 represent bias neurons. The input and bias neurons output an input data without modification, but the input/output characteristics of the hidden and output neurons are specified by the function called a sigmoid function which has saturation as shown in FIG. 3. Let input and output be x and Z, respectively, they are given by $$Z = f(x) = 1/(1 + \exp(-x/T)) \tag{1}$$

where T is a constant defining the slope of the sigmoid function.

Sequentially number each layer from the input side and let input and output of the j-th neuron in the i-th layer be $x_j(i)$ and $Z_j(i)$, respectively. Then the input and output of an input neuron are given by $$x_j(i) = Z_j(i) \quad j = 1, \ldots, n(i), i = 1 \tag{2}$$

$$Z_{n(i)+1}(1) = 1$$

where n(i) is the number of inputs to the i-th layer neurons, and $Z_{n(i)+1}(i)$ is a bias term.

The output of the i-th neuron of the second or third layers is given by $$Zj(i) = f(x_j(i)) \quad j = 1, \ldots, n(i), i = 2, 3 \tag{3}$$

$$Z_{n(i)+1}(i) = 1 \quad i = 2, 3$$

where $Z_{n(i)+i}(i)$ is a bias term.

The neurons between the two consecutive layers are completely connected by synapses. Each synapse has a weight specific to it. An output of each neuron is multiplied by a weight and input to the next layer neurons. Therefore, an input to the j-th neuron of the second or third layer is given by $$x_j(i) = w_j(i-1)Z(i-1) \tag{4}$$
$$i = 2, 3, J = 1, \ldots, n(i-1)$$

where wj(i−1)=(wji(i−1), . . . , wjtn(i−1)+1(i−1)) is a weight vector, and Wjk ( i−1) is a weight of a synapse between the k-th neuron of the (i−1)-th layer and the j-th neuron of the k-th layer.

The output vector of a neuron of the (i−1)-th layer is given by $$Z(i-1) = (Z_1(i-1), \ldots, Z_{n(i-1)}(i-1))^t$$

where t indicates the transpose of the matrix.

In the above-described neural network, it is assumed that the input data set is separated into n(3) classes. In this case, the i-th output neuron is assigned to the i-th class, and if a certain input data set causes the i-th output neuron to take "1" and the other output neurons to take "0", then the input data set is discriminated as the i-th class. In order to enable such discrimination between classes, it is necessary to determine proper weights $w_{ij}(k)$ (h=2, 3). To this end, a training data set consisting of the inputs and their desired outputs is used to determine weights through learning. Let m training data sets be $$\{x_i l(1), S_{jl}\} \tag{5}$$
$$i = 1, \ldots, n(1), j = 1, \ldots, n(3),$$
$$l = 1, \ldots, m$$

then the weights $W_{ih}(i)$ are determined by $$E = \sum_{l=1}^{n} \sum_{j=1}^{n(3)} (Z_{jl}(3) - s_{jl})^2 \to \min \tag{6}$$

where $Z_{jl}(3)$ is an output of the output neuron corresponding to the training data input $x_i l(1)$. A back propagation algorithm described in the above-cited document is widely used for determining weights. According to this algorithm, weights are modified sequentially from the output side to the input side such that the output $Z_{jl}(3)$ for one training data input $x_i l(1)$, i=1, . . . , n (1) becomes near $s_{jl}$ j=1, . . . , n (3). Thereafter, the same procedure is repeated for the next and following training data until the following inequality holds $$|Z_{jl}(3) - s_{jl}| < \epsilon \tag{7}$$
$$i = 1, \ldots, n(3), l = 1, , m$$

where ε is a small positive number used for determining convergence.

After determining the weights of the neural network in this manner, outputs of the neural network for an input data set still not learnt are checked, thereby allowing pattern recognition.

This algorithm has a major advantage that a pattern recognition network can be configured through learning of input and output patterns, without preparing a new classification algorithm.

In the case of using a neural network for applications of prediction, estimation, or the like, there is no-significant difference from the above-described pattern recognition except that a neural network output does not take a discrete value but takes an analog value.

In configuring such a neural network, particularly in optimizing the number of hidden neurons of a multi-layered neural network the paper "Back-propagation with Artificial Selection", Technical Report NC89-104, pp.85 to 90, the Institute of Electronics, Information, and Communication Engineers of Japan, describes that the number of hidden units is optimized by dynamically adding and deleting them while learning.

Furthermore, as described in "Analysis of the Hidden Units of Back-Propagation Model by Singular Value Decomposition (SVD)" IJCNN '90-WASH-DC, 1-739 to 1-742, there is known a method of determining the number of hidden neurons by considering the rank of a matrix of weights of synapses between an input layer and a hidden layer.

The former of the above-described two conventional techniques does not describe a critical value based on which a neuron is to be deleted or not is determined tin this document, based on which a defective unit is to be deleted or not is determined). Therefore, learning is necessary each time the most defective neuron is deleted, requiring the calculation quantity similar to a conventional trial-and-error based simulation. An index indicating the convergence of such learning is also not described. Therefore, if a defective neuron is deleted from the minimum network, there arises a problem that the network will not converge.

The latter conventional technique has a restriction that the number of hidden neurons is equal to or smaller than the number of input neurons. Therefore, this technique is associated with a fatal problem that it is applicable only to a neural network of the type that information is concentrated to hidden neurons.

There is not known an effective method for optimizing the number and contents of input neurons.

Furthermore, in the case where a recognition error or significant prediction error occurs when using a network once learnt, the countermeasure against such a case is only to learn again by adding the data caused such an error to the training data set, resulting in a trial-and-error basis for improving the accuracy of recognition, prediction, or the like. Still further, the back propagation algorithm poses a problem that learning is very slow because each training data is sequentially processed.

SUMMARY OF THE INVENTION

It is an object of the present invention to provide a method of configuring a neural network most suitable for a given condition.

It is another object of the present invention to provide apparatus for tuning weights or reconfiguring a neural network obtained through learning if an input data still not learnt results in erroneous recognition or significant prediction error.

It is a further object of the present invention to provide a high speed learning method.

It is a still further object of the present invention to provide a pattern recognition apparatus effective for detecting a recognition error.

It is another object of the present invention to provide a pattern recognition apparatus capable of recognizing a pattern at a high speed although it is simple in structure.

The given condition cited in the first object of the present invention is a condition designated when configuring a neural network, which includes: (a) optimizing the scale of a neural network (e.g., minimizing the number of input neurons, the number of hidden neurons, the product of the numbers of input and hidden neurons, and the like); (b) designating the accuracy of learning; (c) designating a learning time period; and (d) minimizing the number of erroneous operations for an input data other than training data.

The aspects of the present invention reside in: (A) a method of configuring a neural network for a given condition; (B.) a method of tuning weights of a neural network; (C) a method of reconfiguring a neural network; (D) a method of learning at a high speed; (E) detecting a recognition error; and (F) recognizing a pattern at a high speed. The aspects of the present invention also reside not only in an independent one of the above aspects, but also in the combinations thereof.

Examples of apparatus for solving the above problems will be described theoretically in the following. (A) A method of configuring a neural network for a given condition:

Although the following description is directed to a method of configuring a pattern recognition neural network for a condition of optimizing the network scale, this description is also applicable to a prediction neural network and the like. In recognizing a pattern using a neural network, the outputs of the neural network for a given training data set take either "1" or "0", and the saturation characteristic of a sigmoid function has a significant meaning. The outputs "1" and "0" of a neural network (outputs of hidden neurons or output neurons) correspond to inputs $+\infty$ and $-\infty$ respectively, to output neurons. By representing the outputs "1" and "0" by $1-\epsilon$ and $\epsilon$, respectively, the inequality (7) by which the convergence of learning is determined becomes $$1 \geq Z_{ji}(3) \geq 1-2\epsilon \text{ for } S_{ji}=1-\epsilon \qquad (8)$$

and $$2\epsilon \geq Z_{ji}(3) \geq 0 \text{ for } S_{ji}=\epsilon \qquad (9)$$

For the inputs to output neurons, the above inequalities are given by $$\infty > x_j l(3) \geq \alpha \text{ for } S_{ji}=1-\epsilon \qquad (10)$$

and $$-\alpha \geq x_j l(3) \geq -\infty \text{ for } S_{ji}=\epsilon \qquad (11)$$

where $\alpha=-T \log(1/(1-2\epsilon)-1)=T \log(1/2\epsilon-1)$.

Thus, the finite intervals at the output side correspond to the infinite intervals at the input side. It can be understood that the value defined by the equation (6) is minimized by solving the inequalities, as to the determination of weights of neurons between the output layer and hidden layer. For a more generalized case, the values of output neurons corresponding to "1" and "0" are represented by $1-\epsilon'$ and $\epsilon'$ ($\epsilon' \geq 0$), respectively, wherein $\epsilon=\epsilon'$ (>0). Therefore, even $\epsilon'=0$, the above description stands by setting $\epsilon>0$. In the following description, it is assumed that $\epsilon=\epsilon'$ (>0). The same description is applicable also for $\epsilon>\epsilon'$.

The weights of a neural network can be interpreted as the coefficients of an equation describing a hyperplane. Assuming $x_j(i)=0$ in the equation (4), $$w_j(i-1)Z(i-1)=0 \qquad (12)$$

represents a hyperplane in an $n(i-1)$-dimensional space. The change of weight $W_{j,n(i-1)+1}(i-1)$ of a bias term causes a parallel displacement of the hyperplane. From the equation (1), the value $Z_j(i)$ corresponding to $x_j(i)$ satisfying the equation (12) is ½. It is assumed that the $n(i-1)$-dimensional point $(Z_1(i-1), \ldots, Z_{n(i-1)}(i-1))^t$ is on the positive side of the hyperplane if $$x_j(i)>0 \text{ or } Z_j(i)>\text{½} \qquad (13)$$

and on the negative side if $$x_j(i)<0 \text{ or } Z_j(i)<\text{½} \qquad (14).$$

A class is said to be singly separable by k hyperplanes if all the training data for the class is on the same side of the hyperplanes and no training data for other classes exists in the separated region. If the training data for a class is divided into subsets such that each subset of the data is singly separable by hyperplanes, the pattern is said to be plurally separable. These hyperplanes are called separable hyperplanes hereinafter.

Consider the separation of three classes in the two-dimensional space shown in FIG. 5. The arrows attached to the three hyperplanes P1, P2, and P3 designate the positive sides of the hyperplanes, and each dot in the two-dimensional space denotes a training data. Since all the training data for a class I is on the positive sides of P2 and P3, and no other data exists in this region, the class I is singly separated by hyperplanes P2 and P3. Likewise the class III is singly separated by hyperplanes P1, P2, and P3. Since a class II is divided into subsets such that each subset of the data is singly separated, the class II is plurally separated.

Now the following can be proved.

Consider the separation of the n(1)-dimensional data into n(3) classes. If n(2) hyperplanes in the n(1)-dimensional space exist such that all the learning data in any class can be singly separated by a subset of the n(2) hyperplanes, a class can be separated by a three-layered neural network with n(1) input, n(2) hidden, and n(3) output neurons.

This can be understood in the following manner. Let the n(2) hyperplanes be $$w_j(1)Z(1)=0 \quad j=1,\ldots,n(2) \tag{15}$$

Now let $$Z_j(2) = 1/(1 + \exp(-x_j(2)/T))$$
$$Z_j(2) = w_j(1)Z(1) \quad j = 1,\ldots,n(2) \tag{16}$$

and let them correspond to the first and second layers of the neural network. According to the assumption, $Z_j(2)$ corresponding to the training data is either $$Z_j(2) > \tfrac{1}{2} \text{ or } Z_j(2) < \tfrac{1}{2} \tag{17}$$

thus by multiplying the weight vector $w_j(1)$ by a positive constant, the values of $Z_j(2)$ for the training data can be set to either $$Z_j(2) \text{ or } Z^{2j}(2)=0 \tag{18}$$

Next, the weights between output and hidden neurons are determined. Let the inputs $x_i(3)$ to the output neuron be given by $$x_i(3)=w_i(2)Z(2) \quad i=1,\ldots n(3) \tag{19}$$

The weight vector $w_i(2)$ should be determined so that $x_i(3)$ is 1-ε for the i-th class and ε for classes other than the i-th class. This can be achieved by satisfying $$w_i(2)Z(2) \geq \alpha \text{ for class i} \tag{20}$$

$$w_i(2)Z(2) \leq \alpha \text{ for classes other than class i} \tag{21}$$

If the class i is separated by less than n(2) hyperplanes as the class I in FIG. 5, the planes not contributing to the separation are canceled by setting the corresponding weights to zero. Thus it is assumed that the class i is singly separated by n(2) planes. According to this assumption the outputs $Z_1(2), \ldots, Z_{n(2)}(2)$ for the class are uniquely determined. Therefore, assume for class i $$(Z_1(2),\ldots,z_{(n)}(2))=(1,\ldots,0\ldots,0) \tag{22}$$

namely, assume that the first s outputs are "1", and the remaining outputs are "0".
Now let $$w_{ij}(2)=2\alpha \quad j=1,\ldots,s \tag{23}$$

$$w_{ij}(2)=-2\alpha \quad j=s+1,\ldots,n(2) \tag{24}$$

Thus the equations (20) and (21) become for class i $$W_{i,n(2)+1}(2) \geq \alpha - 2s\alpha \tag{25}$$

for class other than class i $$-\alpha - 2\alpha \sum_{j=1}^{s} Z_j(2) + 2\alpha \sum_{j=s+1}^{n(2)} Z_j(2) \geq W_{i,n(2)+1}(2) \tag{26}$$

Since the class i is singly separated, $Z_j(2)=0$ holds for some j, j=1, ..., s or $Z_j(2)=1$ for some j, j+s+1, ..., n(2). Therefore, the weights $w_{i,n(2)+1}(2)$ satisfying the equations (25) and (26) can be selected, for example, $w_{i,n(2)+1}(2)=\alpha(1-2s)$.

From the proof given above, it can be understood that if the class i is plurally separable, a class can be separated using a four-layered neural network where the third layer classifies each of the separated regions and the fourth layer simply sums up the outputs of the third layer.

If the same class is plurally separable by hyperplanes into several regions and these regions can be separable by one hyperplane from those regions of different classes, a three-layered neural network can be synthesized.

To simplify the proof, the outputs of the hidden neurons are assumed to take "1" and "0" values, however, such an assumption is not necessary in practice.

Now apply the above procedure to the separation of the two-dimensional points shown in FIG. 5. Determine the weights between the input and hidden neurons as the coefficients of equations defining the straight lines in FIG. 5. The signs of the weights are taken such that the positive sides of the planes correspond to the regions indicated by arrows in FIG. 5. Then by multiplying the weights by positive numbers, the outputs of the hidden neurons for each class become as shown in Table 1.

TABLE 1

| Output | Class I | Class II | Class III |
|---|---|---|---|
| $Z_1(2)$ | 1 0 | 0 1 | 1 |
| $Z_2(2)$ | 1 1 | 1 0 | 1 |
| $Z_3(2)$ | 1 1 | 0 1 | 0 |

For the class I, $Z_1(2)$ takes values "1" and "0", but since $Z_2(2)$ and $Z_3(2)$ do not change, $Z_1(2)$ does not contribute to separation. Thus the class I is singly separable by straight lines P2 and P3. Likewise the class III is singly separable by straight lines P1, P2, and P3, while the class II is plurally separable. Thus, the neural network is configured as shown in FIG. 6. In FIG. 6, numerals 1013 to 1016, 1018, and 1019 represent hidden neurons, and numerals 1017, 1020, and 1021 represent output neurons. Numerals 1013, 1014, and 1015 correspond to straight lines P1, P2, and P3,respectively. Numerals 1017, 1021, and 1020 correspond to the classes I, II, and III, respectively. Since the class I is singly separable by the straight lines P2 and P3, the hidden neuron 1013 is not connected to the output neuron 1017. The class II can be singly separated by a four-layered neural network synthesizing two singularly separated regions. The weights of neurons at the fourth layer are determined such that the input/output relationship satisfies Table 2.

TABLE 2

| Input | Output |
|---|---|
| 1 0 | 1 |
| 1 1 | 1 |
| 0 0 | 0 |

For satisfying $$w_{21}+w_{41} \geq \alpha$$

$w_{31}+w_{41} \geq \alpha$ $w_{41} \leq -\alpha$ then let $w_{41}=-\alpha$ it becomes $w_{21}+w_{31}=2\alpha$ Although the outputs of the hidden neurons 1018 and 1019 do not take "1" at the same time, if such is the case, the output of the output neuron takes "1".

Using the above procedure, the scale of a neural network can be minimized. Furthermore, since the separation planes can be set at borders on which training data does not exist, a network having a strong resistance against a recognition error can be configured.

As an alternative procedure for satisfying a condition of optimizing a network scale, there is provided a neural network optimizing design procedure which operates while transferring data to and from a neutral network configuration apparatus having an identification procedure for determining weights of synapses of the neural network in accordance with the contents of training information (known relation between inputs and outputs in the neural network) having input data signals and corresponding desired output data signals.

The neural network optimizing design procedure may be provided with input signal optimizing apparatus and hidden neuron number optimizing apparatus.

(B) A method of tuning weights of a neural network:

It is assumed that a pattern recognition neural network has been configured in accordance with the method (A). However, in this case, only the weights between input and hidden neurons are required to be determined so as to make each pattern separable, and the output of a hidden neuron is not necessary to take "1" or "0". Pattern separation means that the hidden neuron output $Z_i(2)$ for a subset of a training data set containing at least two training data takes either $$Z_i(2) > \frac{1}{2} \text{ or } Z_i(2) < \frac{1}{2} \tag{27}$$

If a recognition error occurs upon input of a training data not learnt $x_i(1)$, i=1, ..., n(1) into the neural network, the input and output of a hidden neuron for $x_i(1)$ are assumed to be represented by $x_j(2)$ and $Z_j(2)$ j=1, ..., n(2). If the training data not learnt belongs to a class k, the input and output are compared with the input and output of a hidden neuron corresponding to the learnt training data corresponding to the class k. A hidden neuron whose training data not learnt exists on the side of a hyperplane where the learnt training data does not exist. This detected hidden neuron caused the recognition error.

Next, the weight for the detected hidden neuron is modified such that the training data not learnt becomes on the same side of the hyperplane where the learning data for the same class exists. In this case, training data for other classes are not changed in position relative to the hyperplane in concern. In modifying a weight, for example, a hyperplane is subject to parallel displacement, i.e., a bias term is modified. For applications such as prediction, weight tuning can be performed by the same method.

(C) A method of reconfiguring a neural network:

For this method, there is provided neural network reconfiguring apparatus comprising apparatus for evaluating the performance of a neural network (such as control performance, recognition rate, generalizing ability, prediction information), apparatus for updating the contents of training data when the performance lowers, and reconfiguration command generating apparatus for activating again the neural network optimizing design means.

(D) A method of learning at a high speed:

A conventional pattern recognition learning method can be sped up by using the concept of the method (A). At the stage when learning has progressed to some extent by using the training data $x_i c$ (1) and $S_{il}$, if $$Z_{il}(3) > 1/2 + \epsilon 1 \text{ or } x_{il}(3) > \epsilon 2 \tag{28}$$
$$\text{for } s_{il} = 1$$

$$Z_{il}(3) < 1/2 - \epsilon 1 \text{ or } x_{il}(3) < \epsilon 2 \tag{29}$$
$$\text{for } s_{il} = 0$$

hold for all i=1, ..., n(3), l=1, ..., m, where $\epsilon_1$ and $\epsilon_2$ are small positive values, stop learning. Let $$M_i = \min \{|X_{il}(3)|\} \tag{30}$$
$$l = 1, \ldots, m$$

and if $M_i < \alpha$, change $w_{ki}(2)$ as follows $$W_{ki}(2) \leftarrow (\alpha/M_i) w_{ki}(2), k = 1, \ldots, \tag{31}$$
$$n(2) + 1$$

If $M_i \geq \alpha$, it is not necessary to modify $w_{ki}(2)$.

If the inequality (28) or (29) holds, all the classes are already separated. Therefore, by multiplying constants to the weights using the procedures (30) and (31), it becomes possible for the outputs of the network to take "1" and "0".

Not only modifying only $w_{ki}(2)$, but modifying $w_{ki}(2)$ after modifying $w_{ij}(1)$ to match the separation hyperplane results in a network having a resistance against a recognition error.

(E) Detecting a recognition error:

Weights for a neural network are learnt using a training data such that the weights for hidden neurons provide a separation hyperplane. If the output pattern of hidden neurons obtained upon input of a training data not learnt becomes coincident with the actual output pattern obtained by a learnt training data, then it is judged that the pattern recognition is correct. If the output pattern is not coincident with the actual output, candidates to be considered correct can be found by checking the actual output pattern.

(F) Recognizing a pattern at a high speed

If separation hyperplanes are correctly learnt, a class can be separated by comparing the outputs of hidden neurons with the class of hidden neurons obtained through learning.

BRIEF DESCRIPTION OF THE DRAWINGS

FIGS. 15 and 16 illustrate calculation for a neural network;

FIG. 17 is a diagram showing training signals;

FIGS. 24A, 24B, and 25 are diagrams illustrating the procedure shown in FIG. 23;

FIGS. 31 and 32 are diagrams illustrating the procedure shown in FIG. 30;

DESCRIPTION OF THE PREFERRED EMBODIMENTS

Figure 1:
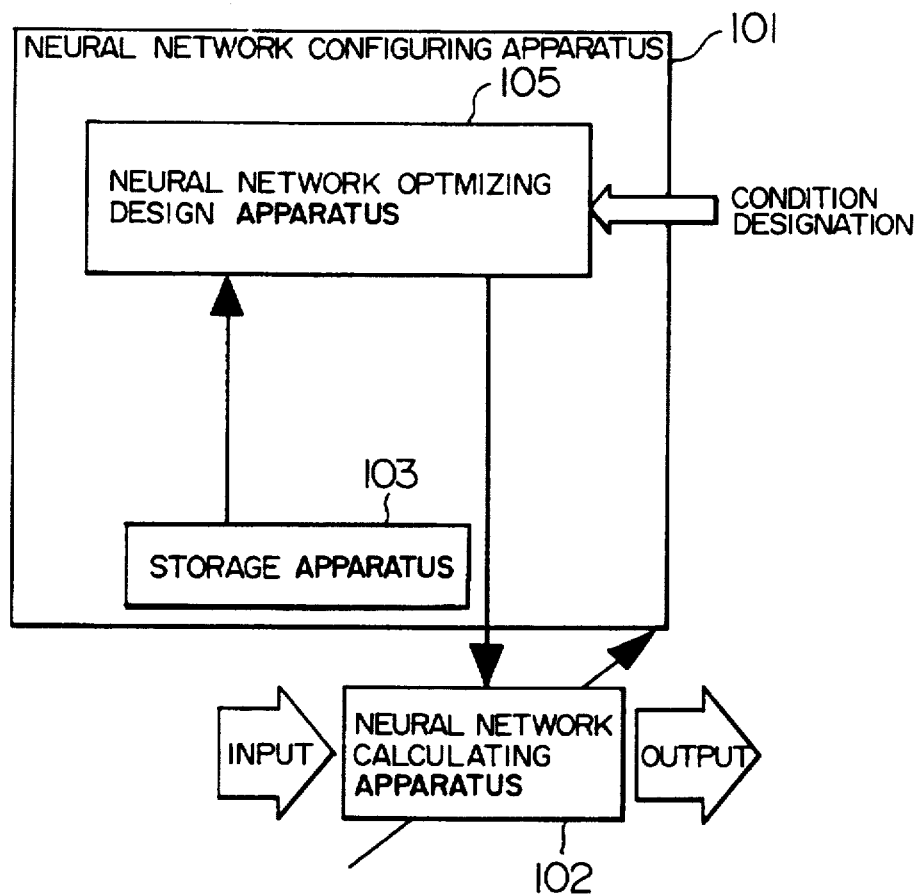
FIG. 1 is a diagram showing an embodiment of the present invention.
Figure 3:
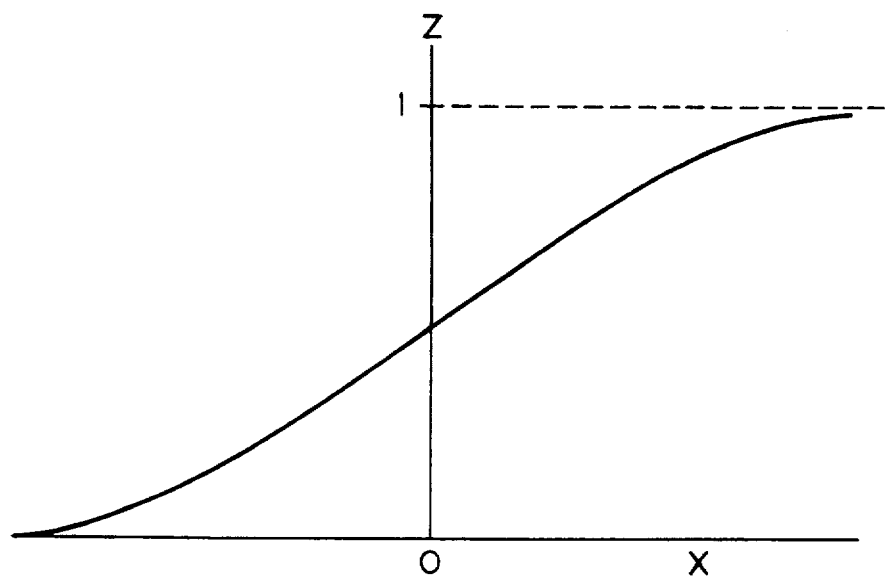
FIG. 3 is a graph showing a sigmoid function.
Figure 2:
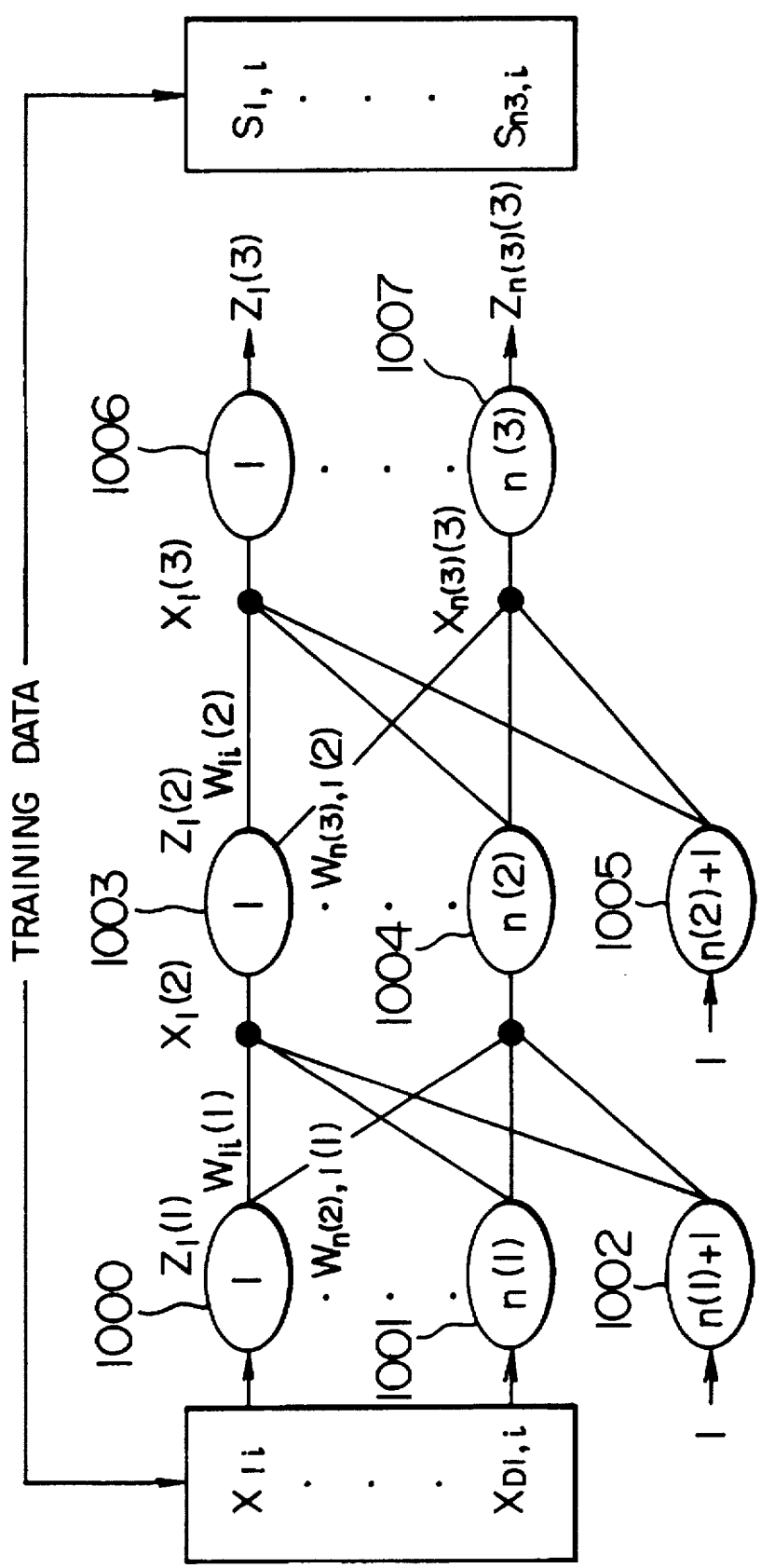
FIG. 2 shows the configuration of a neural network.
Figure 4:
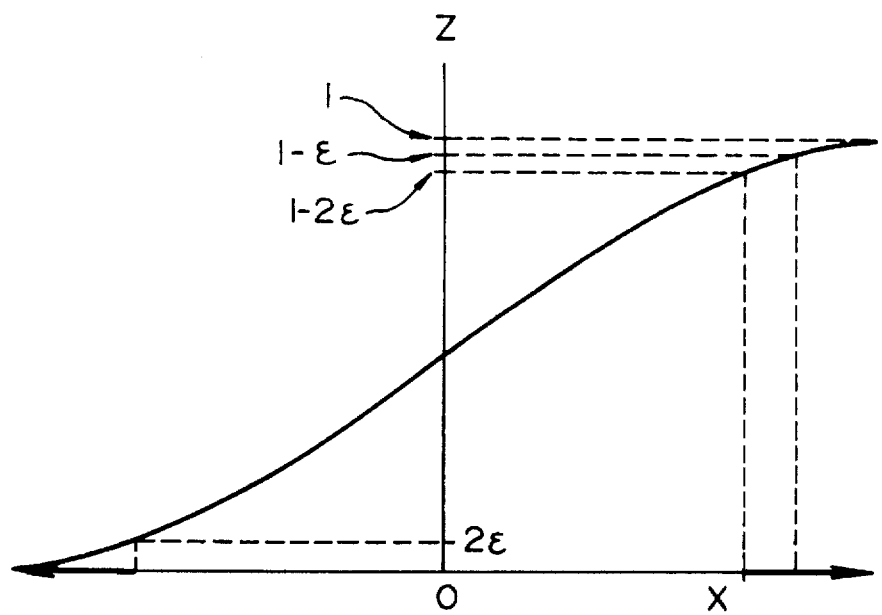
FIG. 4 is a graph illustrating convergence.

An embodiment of the present invention will be described with reference to FIG. 1. In FIG. 1, reference numeral 101 represents a neural network configuring apparatus, 102 represents a neural network calculating means, 103 represents a storage apparatus, and 105 represents a neural network optimizing design means. The neural network calculating apparatus 102 calculates an output signal for an input signal in accordance with a multi-layered neural network configuration. A combination (training data) of inputs and desired outputs is stored in the storage apparatus 103 as indicated by the storage contents shown in FIG. 15 to be described later. The neural network optimizing design apparatus 105 configures a neural network satisfying certain designated conditions, using the training data.

Figure 7:
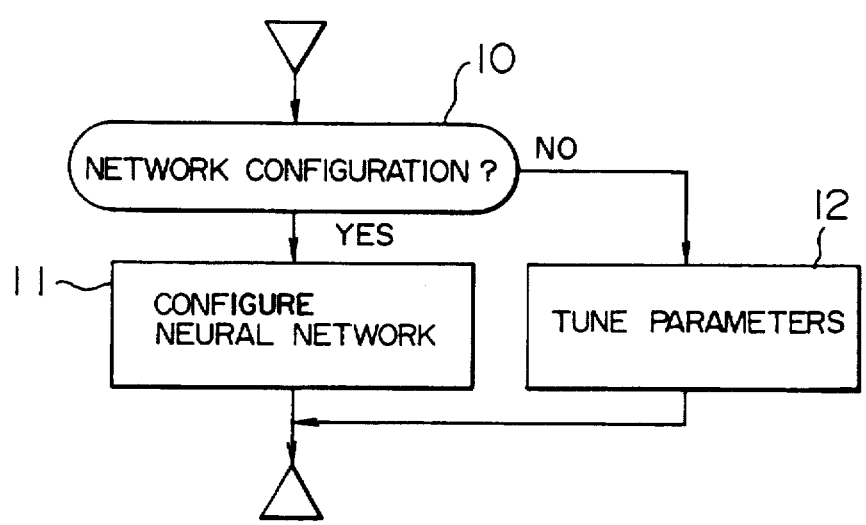
FIG. 7 illustrates optimizing apparatus.

FIG. 7 is a flow chart showing the procedure to be executed by the neural network optimizing design apparatus 105.

At step 10 if a neural network is configured at the first time, then the flow advances to step 11, and if not, the flow advances to step 12.

At step 11, a neutral network is configured and thereafter the flow terminates.

At step 12, the training data is used to check a data which caused an error, and the weights of the neural network are tuned to eliminate such an error to thereafter terminate the flow.

Figure 8:
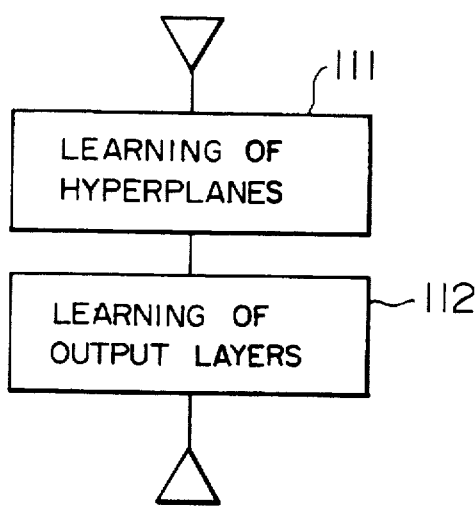
FIG. 8 illustrates a method of configuring a neural network.

FIG. 8 shows the procedure at step 11 for configuring a pattern recognition network under the conditions of minimizing the network scale and providing a high resistance against a recognition error.

At step 111, hyperplanes are determined for separating input data into $n(3)$ classes, by using the training data $(x_{il}(1), s_{ij})$, $i=1, \ldots, n(1)$, $J=1, \ldots, n(3)$, $l=1, \ldots, m$. Then, the number of hidden neurons $n(2)$ and the weights between the input layer and hidden layer $w_{ij}(1) i=1, \ldots, n(2), j=1, \ldots, n(1)$ are determined.

At step 112, the weights, $w_{ij}(2) i=1, \ldots n(3), j=1, \ldots, n(2)$ are determined such that the inequalities (20) and (21) hold for the $n(3)$ classes.

Determining separation hyperplanes at step 111 can be executed using, for example, the procedure described in "Pattern Recognition and Learning Machines", Shoukoudou, 1972, pp. 38 to 41.

After modifying so as to make the outputs of hidden neurons to take "1", and "0", the weights are determined at step 112 using the inequalities (20) and (21). If a class is not singly separable, the network is configured by three or four layers. If not being modified so as to make the outputs of hidden neurons to take "1" and "0", the inequalities (20) and (21) are solved to obtain such values. At step 112, an output of a hidden neuron not contributing to separation is not input to a corresponding output neuron.

Figure 9:
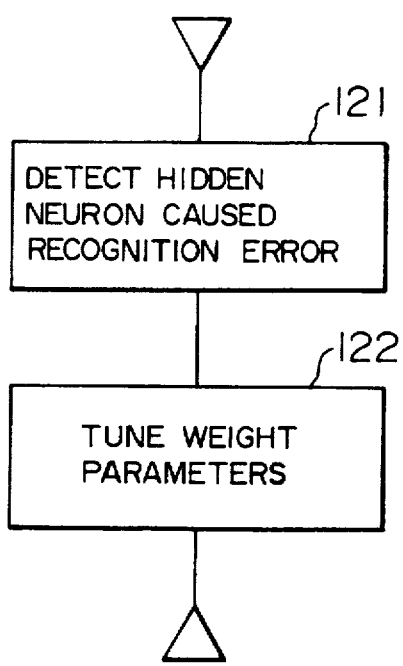
FIG. 9 illustrates a method of tuning weights.

Parameter tuning at step 12 shown in FIG. 7 is detailed in FIG. 9. Specifically, at step 121 a comparison is made between an input $x_j(2)$ (or output $Z_j(2)$) to a hidden neuron for an input data $x_i(1)$, $i=1, \ldots, n(1)$ which caused a recognition error, and an input (or output) to the hidden neuron for the training data of the class j. Then, there is detected a hidden neuron existing on the side of a hyperplane where the training data is not present.

Next, at step 122, the weight for the detected hidden neuron is modified such that the data which caused the recognition error exists on the same side as the training data. In this case, the weight is modified to the extent that the positional relation of the training data separated by hyperplanes is not changed. Thereafter, the weights for the output layer are modified using the same procedure described at step 112 of FIG. 8.

The easiest weight modifying method is to change the bias term and make a hyperplane subject to parallel displacement. The same method at step 111 of FIG. 8 may be used instead.

Figure 10:
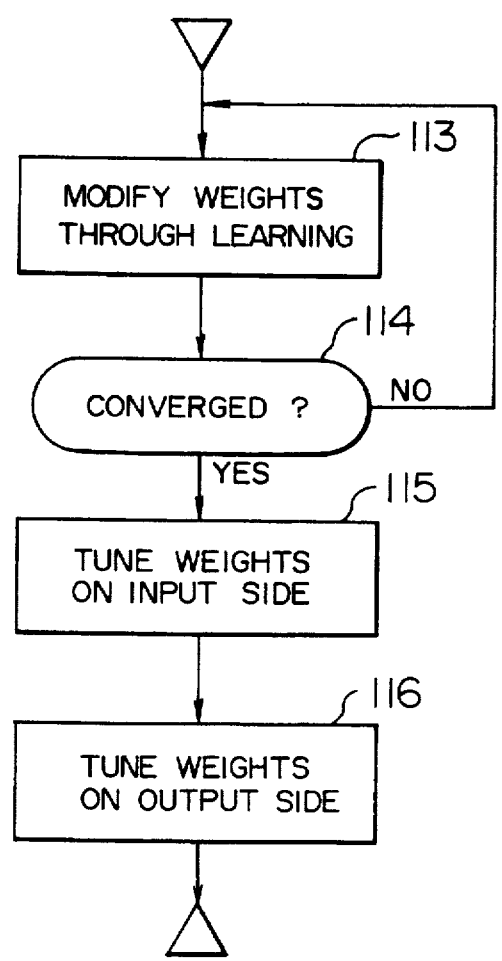
FIG. 10 illustrates speeding up learning.

Another embodiment of step 11 of FIG. 7 is shown in FIG. 10.

First at step 113, the weights of a neural network are modified using the training data $(x_{il}(1), s_{ij})$ in accordance with the back propagation algorithm or other methods.

Next at step 114, it is checked if the inequalities (28) and (29) are held or not. If affirmative, it is considered that the network has converged, and the flow advances to step 115. If negative, the flow returns to step 113.

At step 115, the weights on the input side are tuned to provide a separation hyperplane. For example, this is executed by changing the bias term to make the hyperplane subject to parallel displacement.

After modifying the weights on the input side, the weights on the output side are modified at step 116 by the same procedure described at step 112 of FIG. 8. In this case also, a hidden neuron not contributing to pattern separation is not coupled to the corresponding output neuron.

In the above procedure, step 115 may not be carried out. In such a case, the weights $W_{kj}(2)$ are modified by the same procedure as at (30) and (31).

Figure 5:
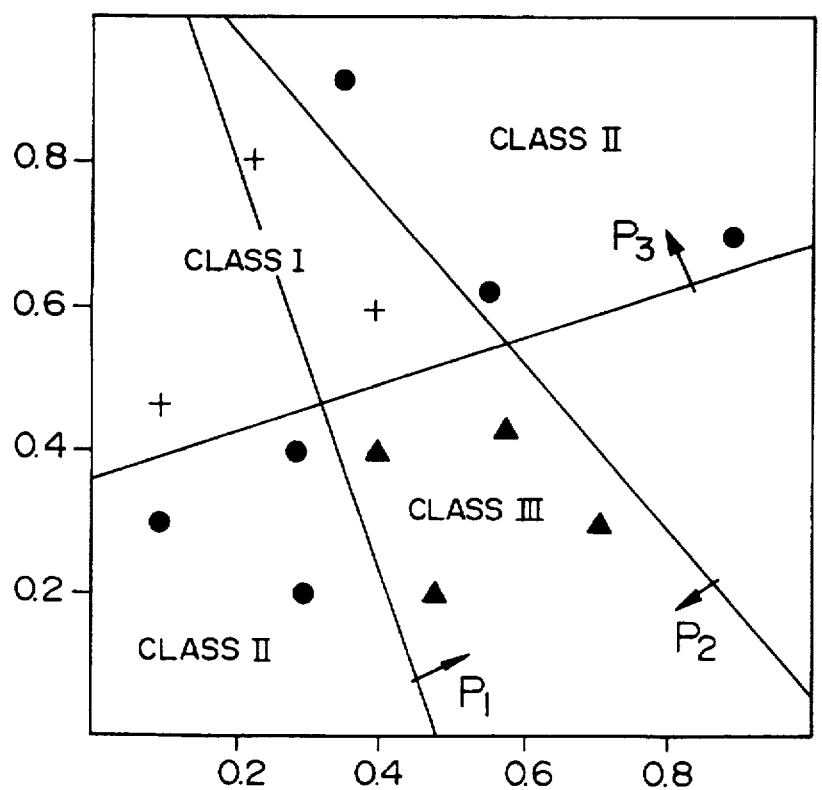
FIG. 5 is a diagram illustrating class separation of two-dimensional data.
Figure 6:
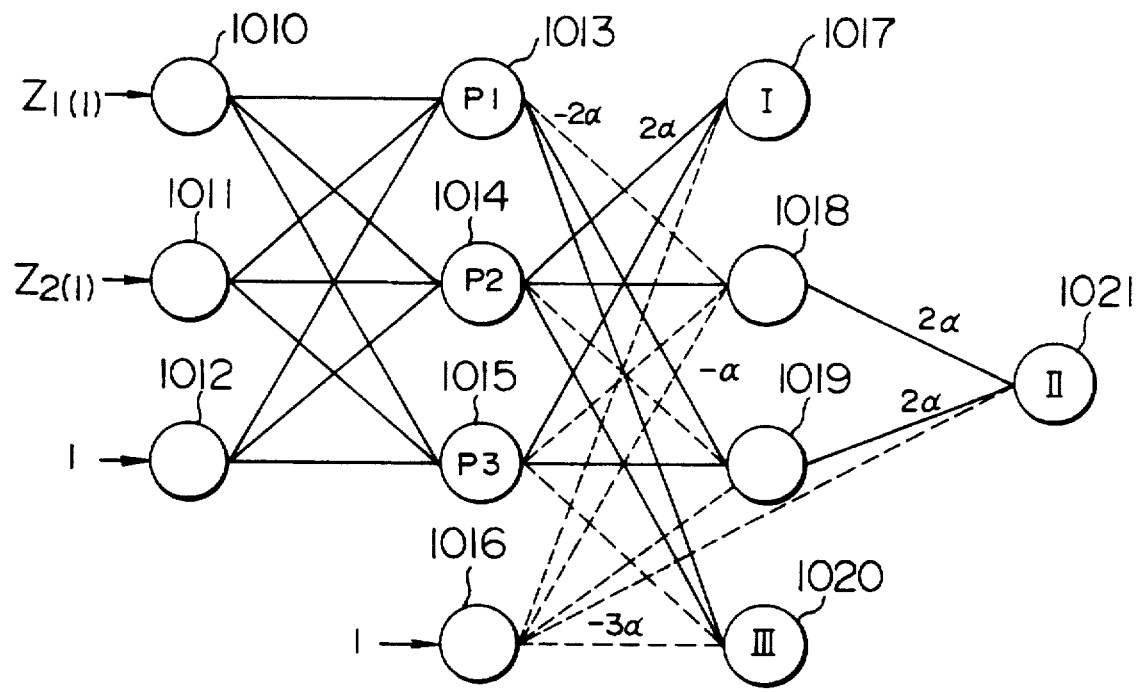
FIG. 6 is a diagram showing a neural network which separates classes shown in FIG. 5.
Figure 11:
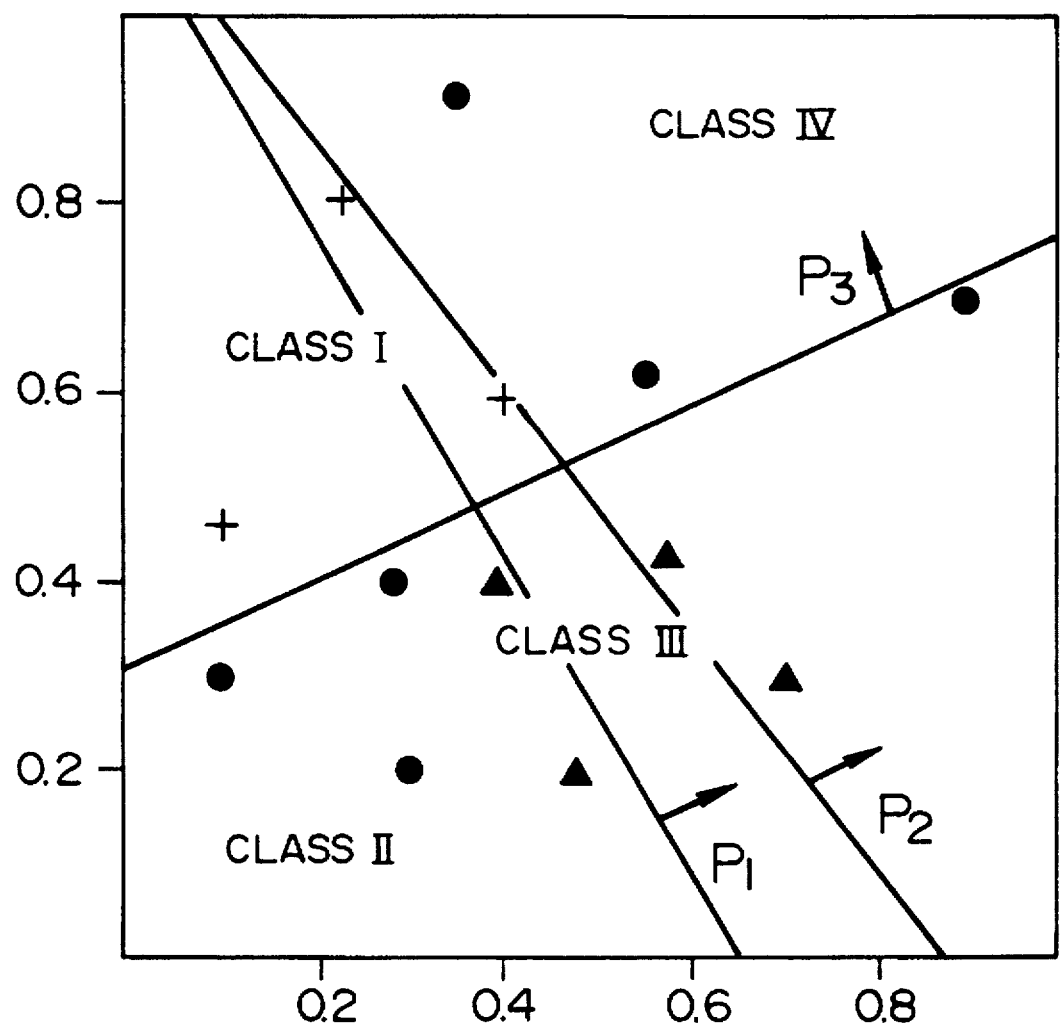
FIG. 11 is a diagram showing an example of learning in the manner described with FIG. 10.

By dividing class II shown in FIG. 5 into classes II and IV to make them singly separable, the learning results for hyperplanes, using steps 113 and 114 shown in FIG. 10, being shown in FIG. 11. In this case, in learning at step 113 the weights for neurons are determined collectively for each layer by supplying the input data. If the bias terms for P1, P2, and P3 shown in FIG. 11 are subject to parallel displacement, the classes are separated as shown in FIG. 5, thus allowing an execution of steps 115 and 116.

In the above manner, a neural network having a high resistance against a recognition error can be configured.

Figure 12:
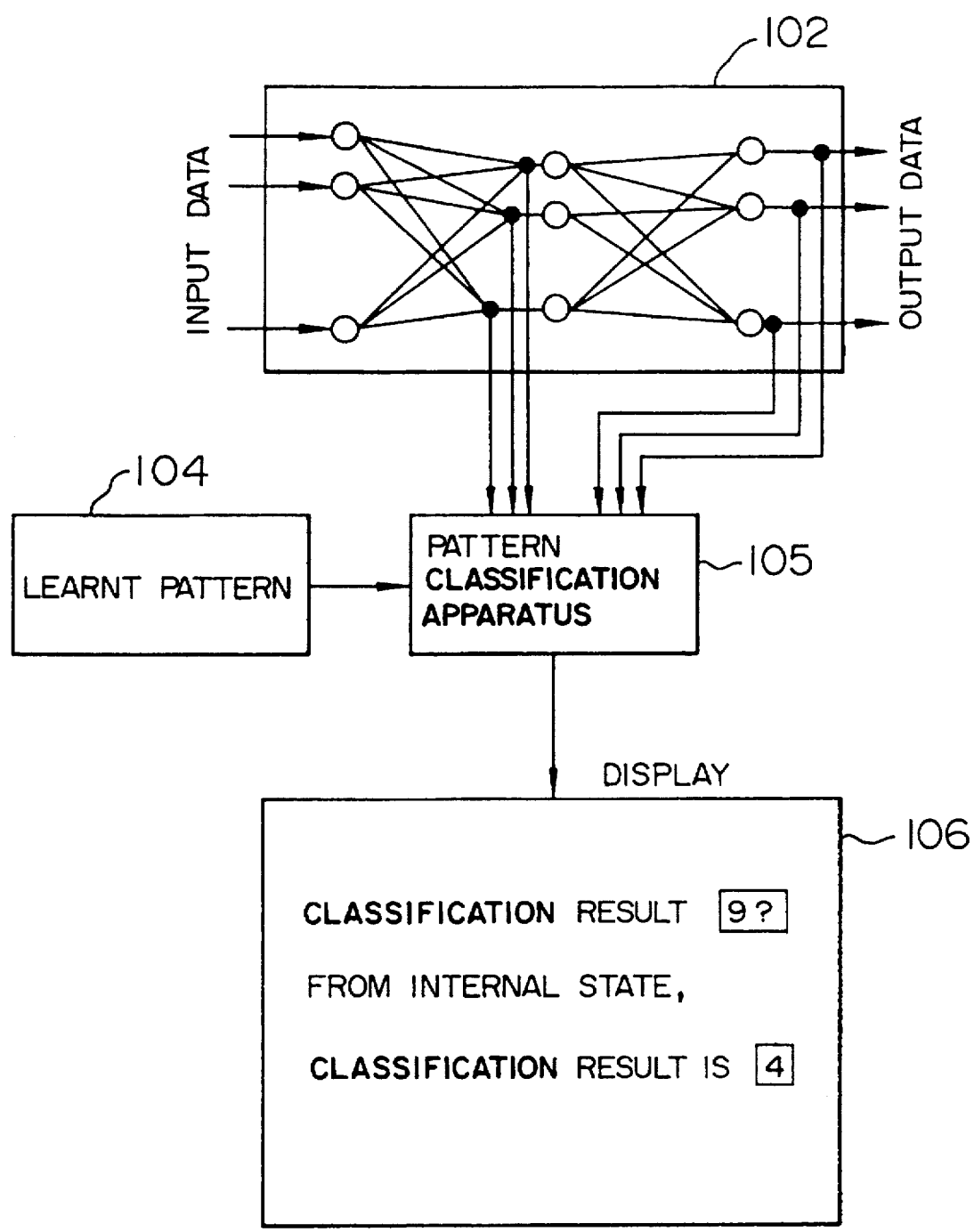
FIG. 12 is a diagram showing another embodiment of the present invention.

Another embodiment of the present invention is shown in FIG. 12. In FIG. 12, numeral 102 represents a neural network configured through learning, 105 represents a pattern classification means, 106 represents a display for displaying a classification result, and 104 represents a memory for storing learnt patterns.

First, the memory 104 for storing learnt patterns will be described. Separation hyperplanes corresponding to learnt patterns can be set by checking the outputs of hidden neurons after learning the neural network using the training data. Table 3 shows learnt patterns relative to separation hyperplanes wherein numbers "0" to "9" are learnt using a three-layered neural network with the number of hidden neurons being set to 4.

TABLE 3

| Output | 0 | 1 | 2 | 3 | 4 | 5 | 6 | 7 | 8 | 9 |
|---|---|---|---|---|---|---|---|---|---|---|
| $Z_1(2)$ | 1 | 1 | 1 | 0 | 0 | 1 | 1 | 0 | 0 | 0 |
| $Z_2(2)$ | 0 | 1 | 1 | 1 | x | 0 | 0 | 1 | 0 | 0 |
| $Z_3(2)$ | 1 | 1 | 0 | 0 | 1 | 0 | 0 | 0 | x | 0 |
| $Z_4(2)$ | 0 | 0 | 1 | 0 | 0 | 0 | 1 | 1 | 1 | 0 |

In this Table showing learnt patterns, the outputs of each hidden neuron are classified for the training data set of each number in such a manner that if the output of a hidden neuron in the learnt neural network takes a value larger than 0.5, it is set to 1, and smaller it is set to 0. If some of the hidden neuron outputs for a certain number are not separable by the training data, a value 0.5 indicating a border between "0" and "1" may be changed to another value for each neuron. Furthermore, if an output takes 0.5, it means that the input is "0" from the equation (1). Therefore, the pattern may be separated in accordance with the inputs to hidden neurons. In the above manner, learnt patterns for each class to be separated are stored in the memory 104. For a neural network having four or more layers, hidden neurons having learnt separation hyperplanes are used.

The pattern classification section 105 classifies an input to the neural network, in accordance with the outputs and internal states supplied from the neutral network 102 and the learnt patterns supplied from the memory 104. First, the maximum one of the outputs is obtained. In an ordinary classification, a class is classified based on this maximum value. It is assumed that in this number recognition, this maximum value corresponds to the ninth neuron, i.e., a number "9". This classification may be executed based on a sum of inputs to output neurons. Next, a learnt pattern corresponding to a class classified by the maximum output value is read from the memory 104. This pattern for the number "0" is "0000". If the input to the neural network results in the outputs "0110" (which may be converted from the sum of inputs) at the hidden neurons, then there is a possibility of an erroneous classification of the outputs. If the output patterns do not coincide with each other, a candidate for correct classification is detected based on the outputs of the hidden neurons. In the case of the outputs "0110", the pattern is possibly "4" as seen from Table 3. This classification results are displayed on the display 106.

Figure 13:
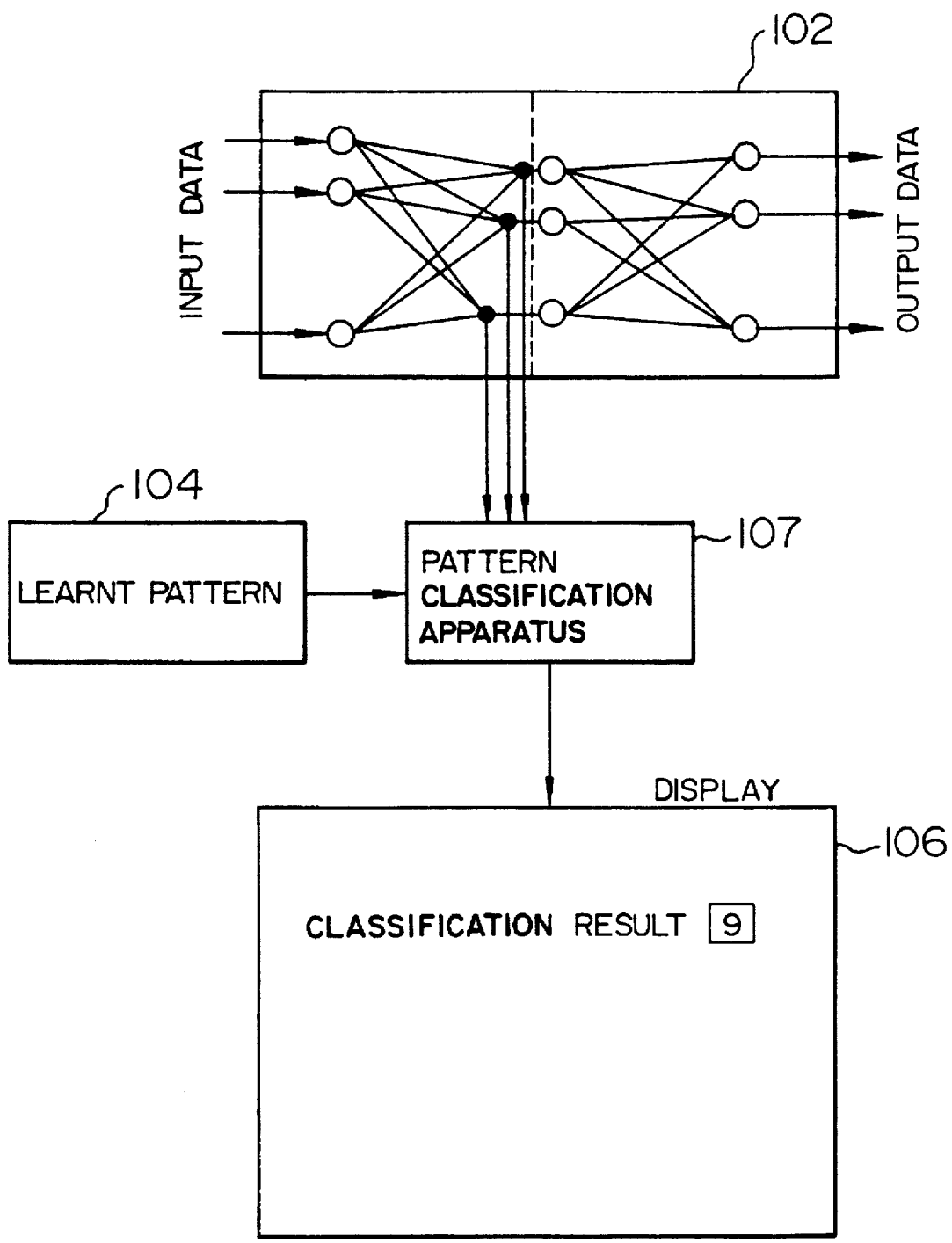
FIG. 13 is a diagram showing a further embodiment of the present invention.

If correct separation hyperplanes are completely learnt by the neural network, pattern classification can be made in accordance with the outputs (or a sum of inputs) of hidden neurons having learnt separation hyperplanes and in accordance with the learnt patterns. An embodiment for such a case is shown in FIG. 13. In FIG. 13, numeral 107 represents a pattern classification apparatus for recognizing a pattern in accordance with the learnt pattern and the internal state of the neural network. Although FIG. 13 shows an example of a three-layered network, a network having four or more layers is also applicable if hidden neurons having learnt separation hyperplane are used. Namely, in the neural network shown in FIG. 13, the right side section of the broken line is not necessary, simplifying the structure to be used for pattern recognition. The pattern classification apparatus 107 retrieves a learnt pattern from the memory 104, which pattern corresponds to the internal state, i.e., a pattern represented by a sum of inputs to the hidden neurons, of the network upon reception of an input data set. A class corresponding to the retrieved pattern is used as a classification result. In the number recognition described above, if the pattern of hidden neurons for an input data set is "0000", then it is classified as a number "9" from Table 3. The result "9" is displayed on the display 106. In the classification by the pattern discriminating apparatus 107, instead of the pattern matching, a two-way branching method of branching to "0" or "1" may be used while providing a higher classification speed.

Figure 14:
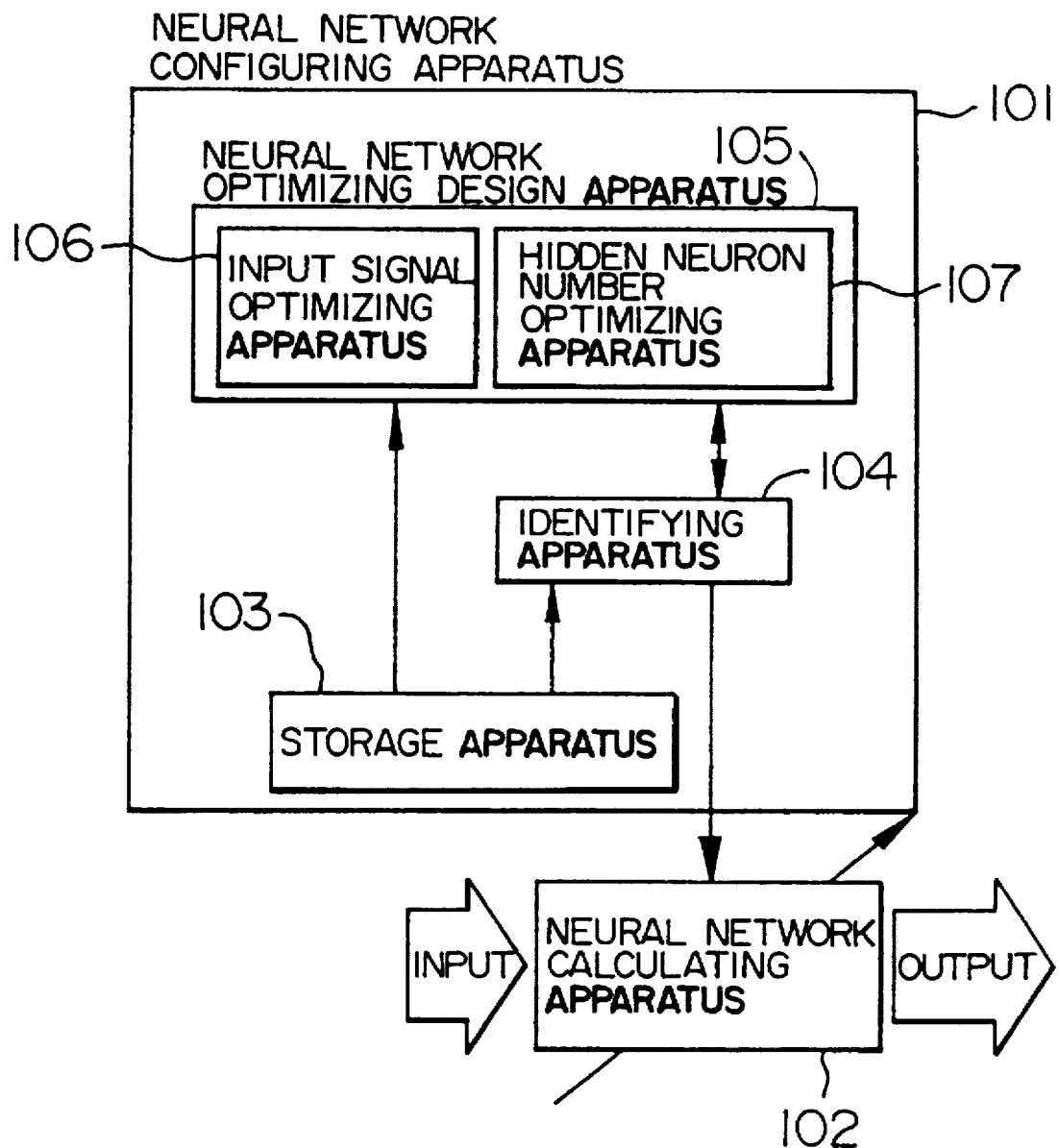
FIG. 14 is a diagram showing the configuration of a still further embodiment of the present invention.

Another embodiment of the present invention will be described with reference to FIG. 14 showing the outline of a neural network system. In this embodiment, a neural network configuring apparatus 101 transfers data to and from a neural network calculating apparatus 102 which processes inputs in a manner to be described later to obtain desired outputs. Combination (training data) of inputs and desired outputs calculated by the neural network calculating apparatus 102 are stored in a storage apparatus 103. The neural network configuring apparatus 101 includes an identifying means for determining operation constants used by the neural network calculating apparatus 102, in accordance with the training data stored in the storage apparatus 103, and a neural network optimizing design apparatus 105 for determining an optimum configuration of the neural network calculating apparatus 102, in accordance with the contents of the storage apparatus 103 and the learnt results by the identifying apparatus 104. The neural network optimizing design apparatus 105 includes an input signal optimizing apparatus 106 for optimizing the contents of input signals to the neural network calculating apparatus 102, and a hidden neuron number optimizing apparatus 107 for determining the optimum number of hidden neurons constituting the internal structure of the neural network calculating apparatus 102. The function of each element will now be described below.

Figure 15:
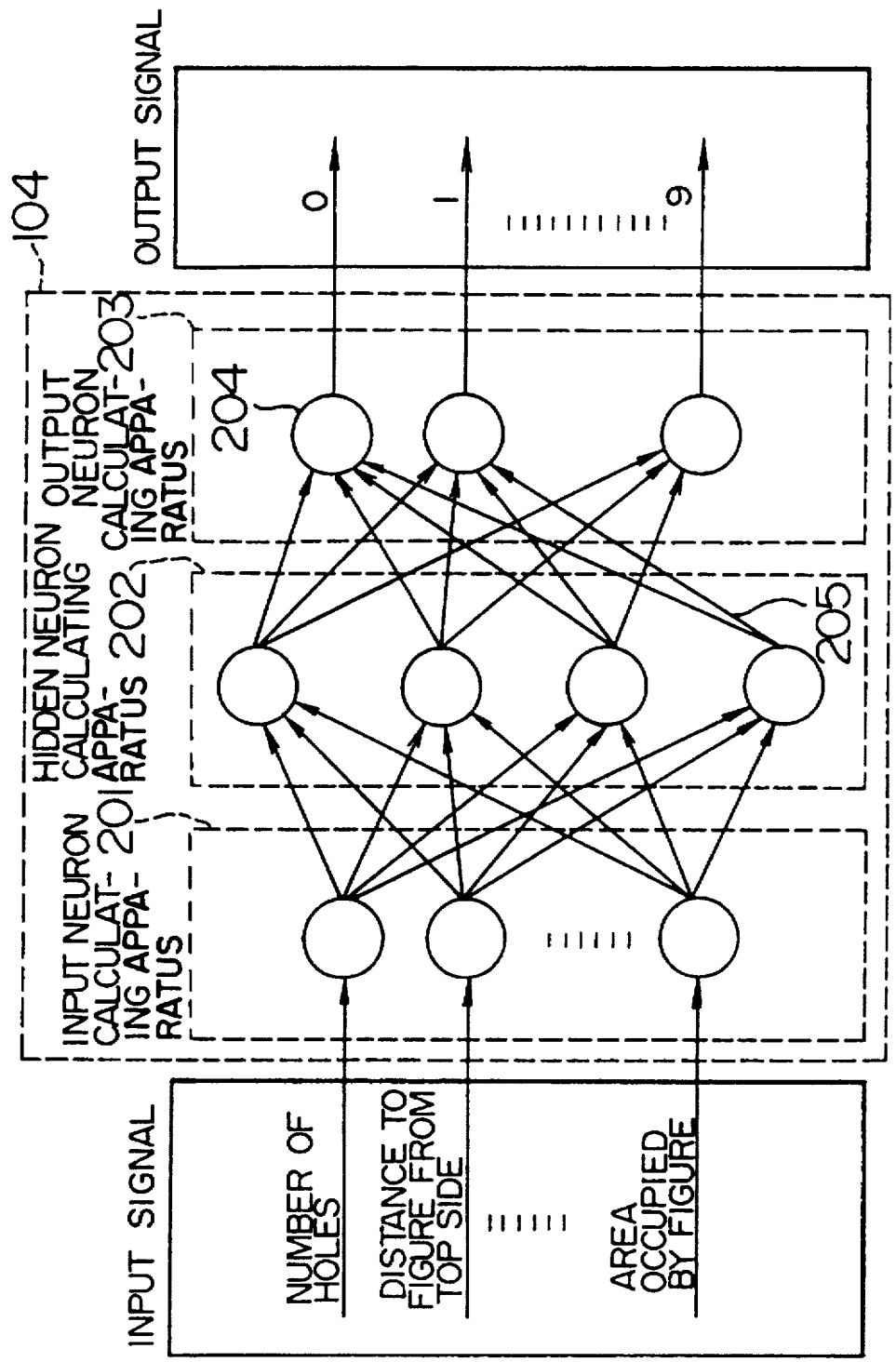

As shown in FIG. 15, the neural network calculating apparatus 102 is constructed of an input neuron calculating apparatus 201, an hidden neuron calculating apparatus 202, and an output neuron calculating apparatus 203. The input neuron calculating apparatus receives input signals necessary for the neural network calculation (feedback signals from elements to be controlled in the case of control applications, and graphics information of elements to be recognized in the case of pattern recognition). The output neuron calculating apparatus 203 outputs the operation results corresponding to a control command or a recognition result. Each calculating apparatus includes a plurality of operation units 204. An arc interconnecting operation unit 204 indicates a signal flow between the operation units, as shown. Each operation unit 204 receives an output from another operation unit connected by an input arc, calculates it as described later, and outputs the calculated result to another operation unit connected by an output arc. The neural network calculating apparatus 101 shown in FIG. 15 is applied to a system for recognizing numbers "0" to "9". Each neuron of the input neuron calculating apparatus 201 is input with parameters required for discriminating between the numbers, such as the number of holes or blanks in a shape of each number. Instead of inputting such parameters, the shape of each number maybe divided into a suitable number of regions to input information of each region (whether there is any pixel within the region or not) to the neuron corresponding to the region. Each neuron of the output neuron calculating apparatus 203 is adapted to operate for a corresponding one of the numbers "0" to "9". When a signal assigned to a number is input to the corresponding output neuron, it becomes active to output a signal representative of the number.

FIG. 16 illustrates the operation to be executed by the operation unit 204, taking the operation unit of the hidden neuron calculating apparatus 202 as an example. Input values $X_i$ to X. received from other operation units are multiplied by weights $W_i$ corresponding to the input values. A sum u of the multiplied results is given by $$u = \sum_{i}^{n} W_i X_i. \qquad (32)$$

The value u is mapped using a predetermined function f to determine an output value Y. The function may take various forms. A function widely used is called a sigmoid function which has a non-linear saturation function defined by the following equation (33)

$$f(u)=1/[1+e^{-T(u+u0)}] \qquad (33)$$

where T and $u_0$ are constants.

The operation unit of the hidden neuron calculating apparatus 202 shown in FIG. 16 has a plurality of inputs and outputs. In the case of the operation unit of the input neuron calculating apparatus 201, it has a single input as apparent from FIG. 15, and n=1 in FIG. 16. Conversely, in the case of the operation unit of the output neuron calculating apparatus 203, it has a single output. The neural network calculating apparatus 102 may have a multi-stage structure having two or more hidden neuron calculating apparatuses or a structure where the output neuron calculating apparatus 203 is directly connected to the outputs of the input neuron calculating apparatus 201. Furthermore, conversion at the input neuron calculating apparatus 201 using the function f may be omitted.

The storage apparatus 103 stores combinations of input signals and desired output signals of the neural network calculating apparatus 102, for example in the format shown in FIG. 16. In this embodiment, the input signals are constructed of the graphics information such as described above, and the output signals correspond to "0" to "9" and are represented, for example, by "1" for an object number and "0" for the other numbers. These "1" and "0" are used as the identification data of the identifying apparatus 104. Combinations of input signals and output signals may be stored in the storage apparatus 103 in the format as shown in FIG. 17, as the evaluation data for the identification result.

Figure 18:
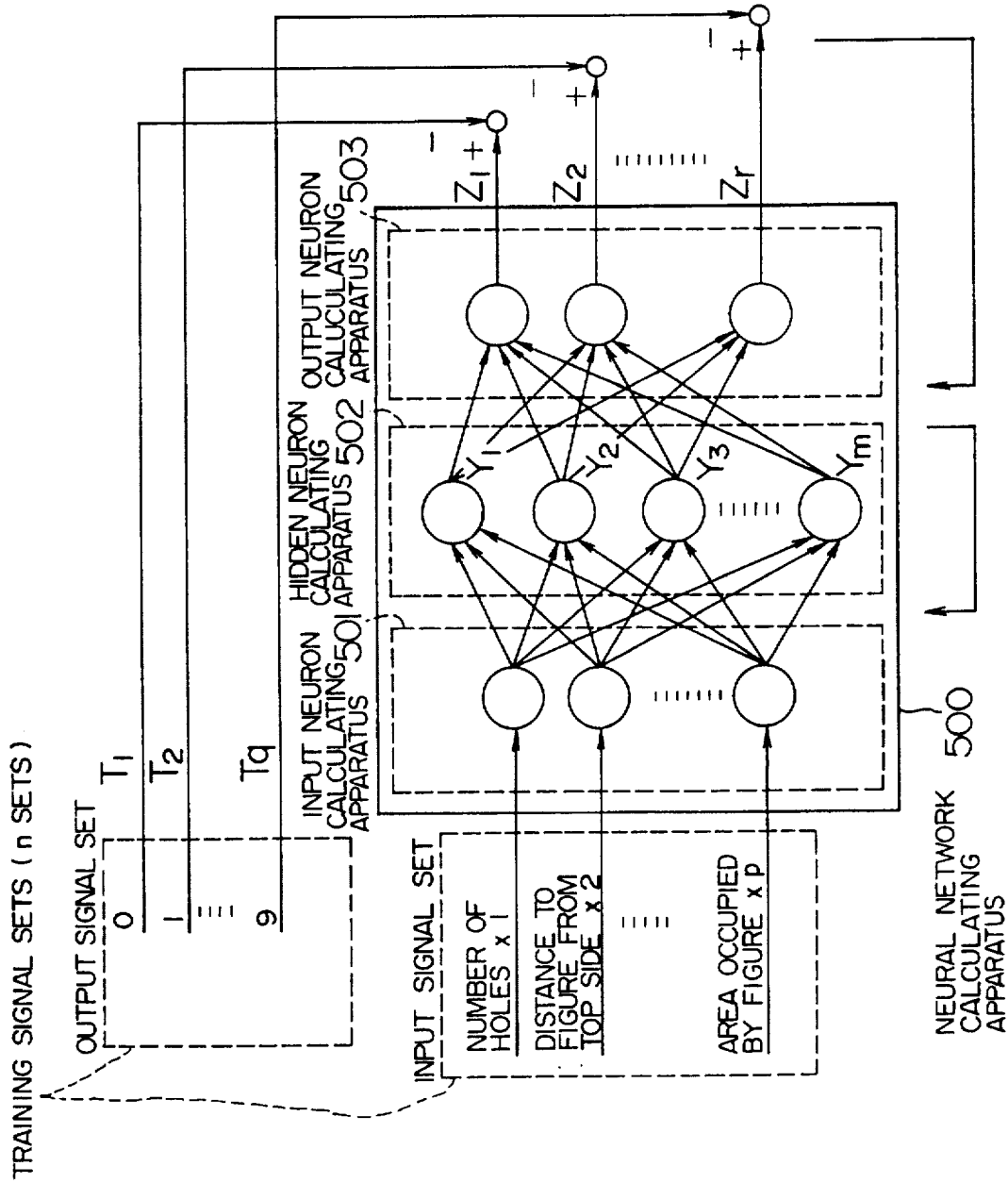
FIG. 18 illustrates identifying apparatus.

The identifying apparatus 104 identifies through learning the relationship of the combinations of input signals and output signals stored in the storage apparatus 103. The identification is conducted by changing the weights $W_i$ of synapses for each neuron, as described with the equation (32). The final identification result determines the weights of synapses which are transferred to the neural network calculating apparatus 102. FIG. 18 shows the structure of the identifying apparatus 104. In this embodiment, the identification is carried out through interactive learning. As shown in FIG. 18, the identifying apparatus includes a neural network calculation simulating apparatus 500 which is constructed of an input neuron calculating apparatus 501, a hidden neuron calculating apparatus 502, and an output neuron calculating apparatus 503, respectively corresponding to those apparatus of the neural network calculating apparatus 102. The identifying apparatus also has a function to receive a training data set consisting of an input signal set and output signal set from the storage apparatus 103, and a function to modify the weights $W_i$ of synapses of each neuron in accordance with the difference between the output of the output neuron calculating apparatus 503 and the corresponding signal of the output signal set. In the following the back propagation method typical for learning will be described.

First, one combination of input and output signal sets stored in the storage apparatus 103 is derived. Input signals are supplied to corresponding neurons of the input neuron calculating apparatus 501. Each operation unit calculates as described previously. The value output from each neuron of the output neuron calculating apparatus 503 is compared with the value of the corresponding signal of the output signal set, to thereby detect a difference between the two values. In accordance with the algorithm known as the back propagation algorithm, the weights $W_i$ for the operation units of the calculating apparatus 501 to 503 are modified such that the differences become smaller. The details of the weight modification is described, for example, in "Neural Computer", by Kazuyuki AIHARA, Tokyo Denki College Publication Department, pp. 10 to 113. After completely of modifying the weights for all neurons, the identifying apparatus 104 then derives another combination of input and output signal sets, to modify the weights in the same manner as above. The above procedure is repeated for all combinations of input and output signal sets stored in the storage apparatus 103. Such a procedure is repeated until the differences become equal to or smaller than an allowable value. The weights $W_{ij}$ (i is an arc number, and j is a neuron number) for each neuron determined in the above manner are transferred from the identifying apparatus 104 to the neural network calculating apparatus 102 which in turn determines the weight of each synapse of the neural network calculating apparatus 102.

The neural network optimizing design apparatus 105 of this embodiment includes, as described above, the input signal optimizing apparatus 106 and the hidden neuron number optimizing apparatus 107. The input signal optimizing apparatus 106 analyzes and optimizes the contents of an input signal set stored in the storage apparatus 103. The hidden neuron number optimizing apparatus 107 determines the optimum number of hidden neurons while considering the outputs of each neuron of the hidden neuron calculating apparatus by sequentially inputting the input signal set to the neural network calculation simulating apparatus 500 configured as the result of learning by the identifying apparatus 104.

Figure 19:
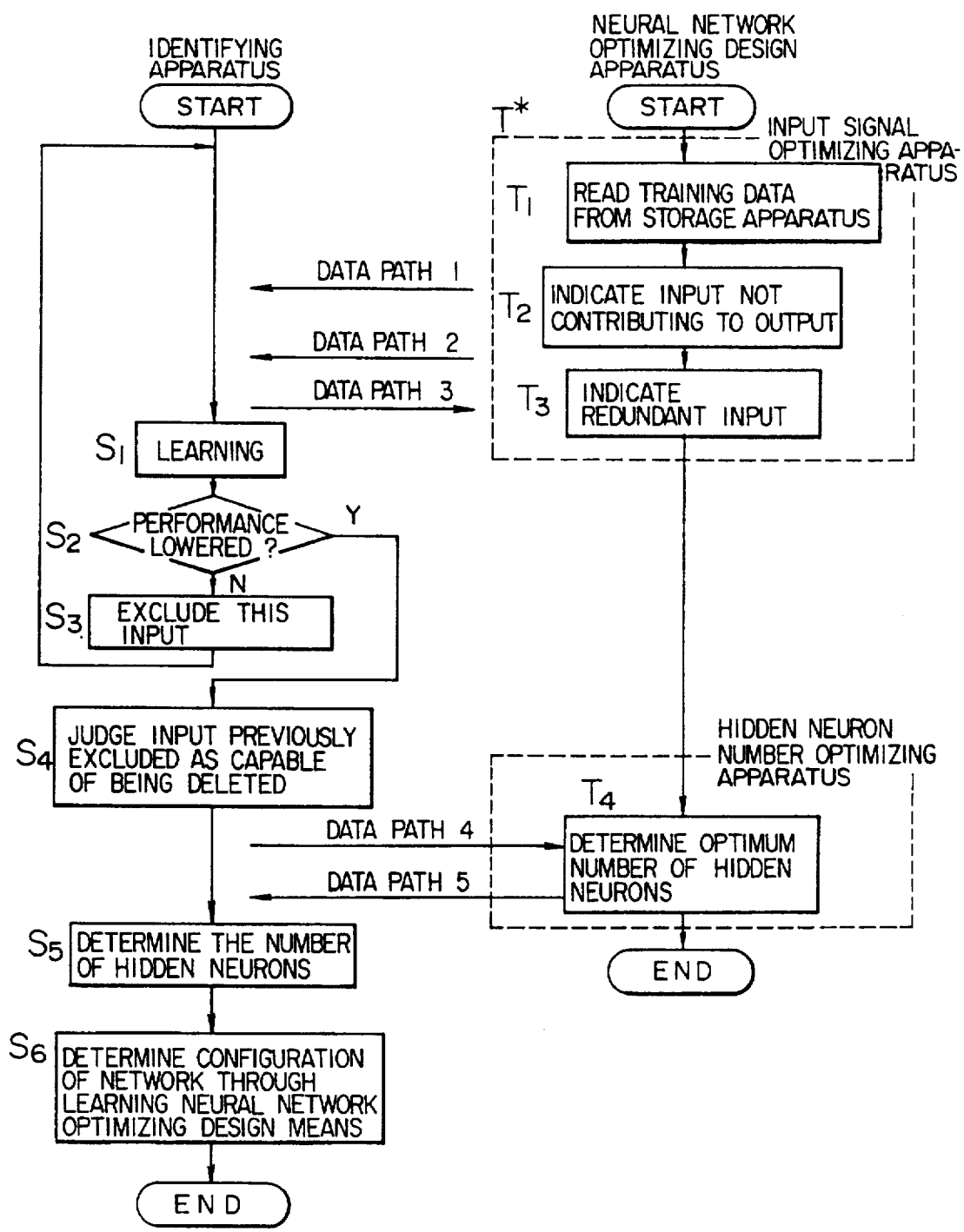
FIG. 19 illustrates algorithms.

FIG. 19 illustrates the algorithm to be executed by the neural network optimizing design apparatus 105 and the information exchange scheme of the identifying apparatus 104. Steps T* ($T_1$ to $T_3$) represent the function of the hidden neuron number optimizing apparatus 106, and step $T_4$ represents the function of the hidden neuron number optimizing apparatus 107. In this embodiment, the input signal optimizing apparatus 106 first operates and then the hidden neuron number optimizing apparatus 106 operates. The input signal optimizing apparatus 106 first takes up a training data set (input and output signal sets) from the storage apparatus 103 at step $T_1$. Using the training data set, an input not contributing to an output is judged as a redundant input at steps $T_2$ and $T_3$.

Figure 20:
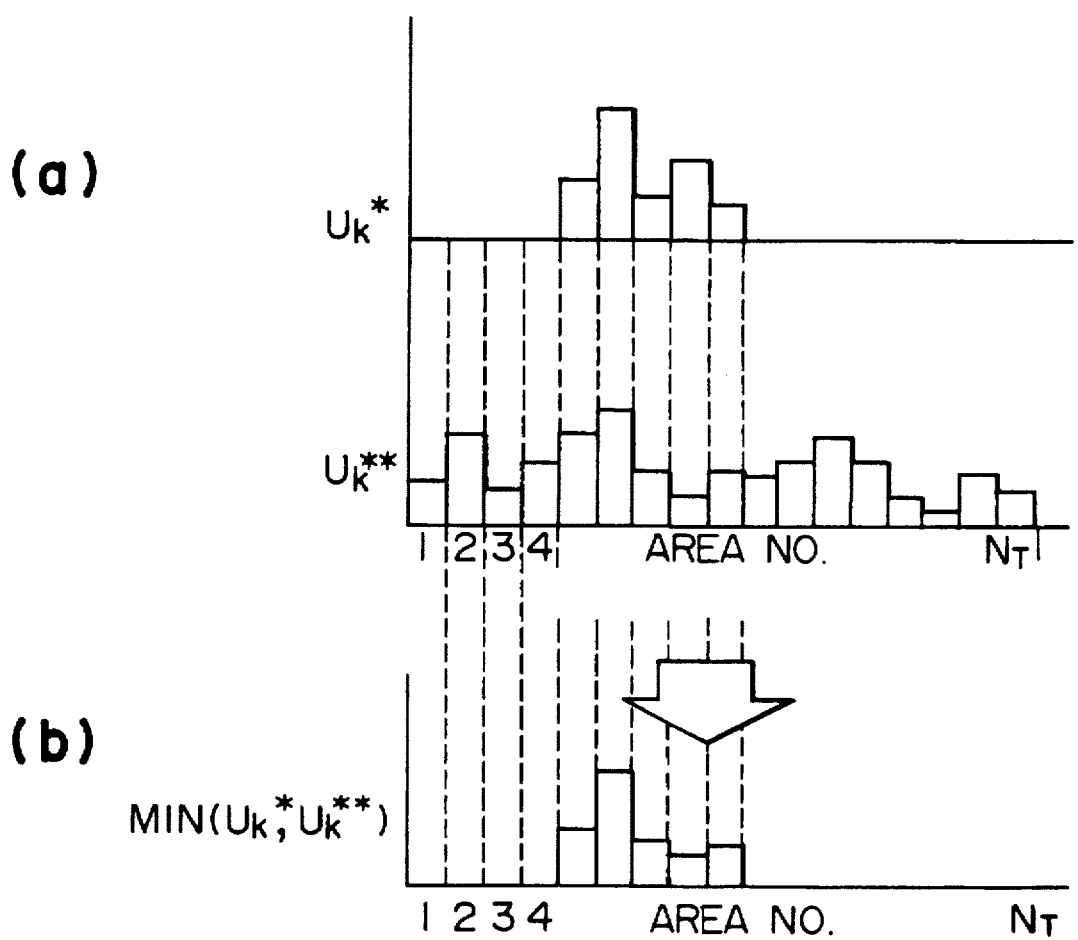
FIGS. 20, 21A, 21B, 21C, and 22 are diagrams illustrating the procedure to be executed by input signal optimizing apparatus.

As the method of identifying an input not contributing to an output, there is provided in this embodiment, a method of considering the values at each input neuron and output neuron for the training data. The values of the training data corresponding to an arbitrary input neuron and output neuron are $X_i$ and $T_i$ (i=1, 2, ..., N, where N is the number of training data sets). The full scale of an input value is divided into an arbitrary number $N_T$ of areas. The value of $T_i$ corresponding to $X_i$ belonging to each divided area (1, ..., Nt) is obtained. In this case, the number of areas for $T_i \geq T_{mean}$ which is a mean value of $T_i$ and the number of areas for $T_i < T_{mean}$ are counted to obtain two histograms shown in FIG. 20A.

Figure 21A:
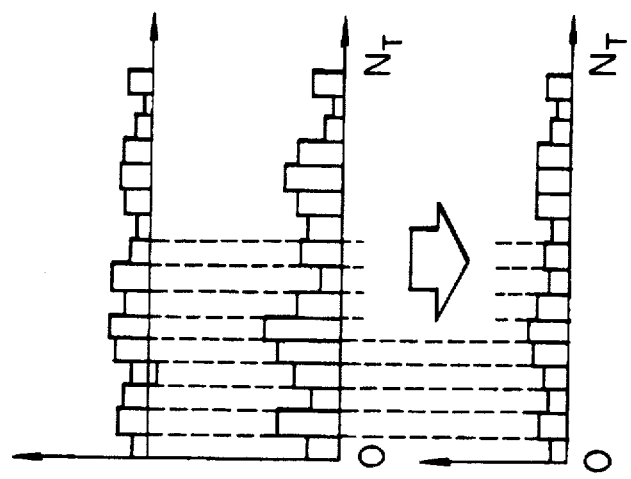
Figure 21B:
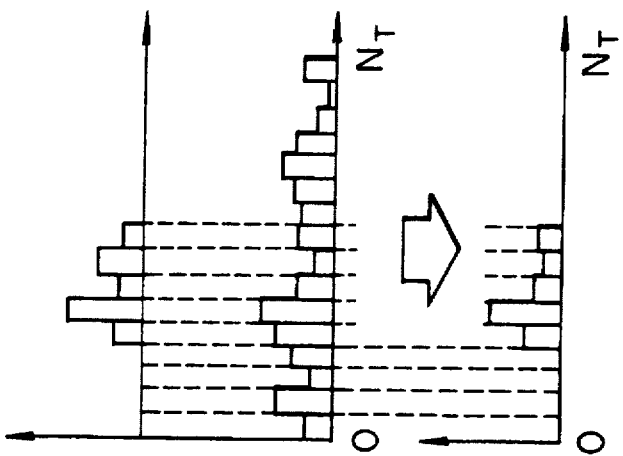
Figure 21C:
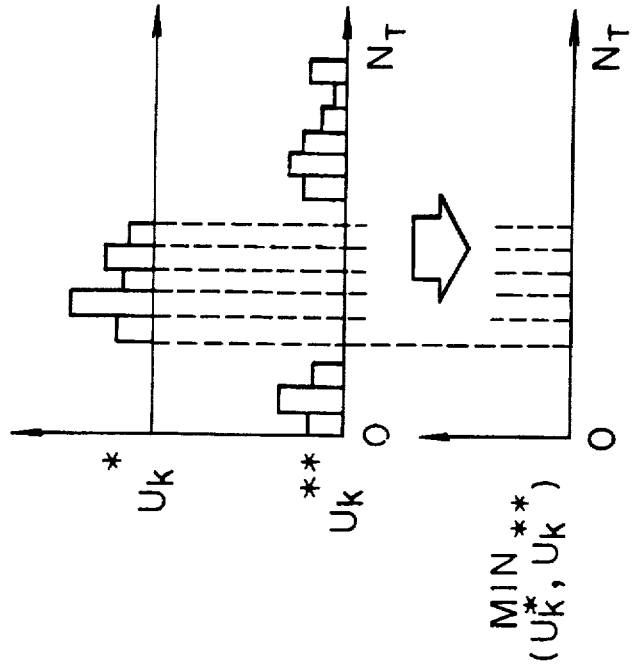
Figure 22:
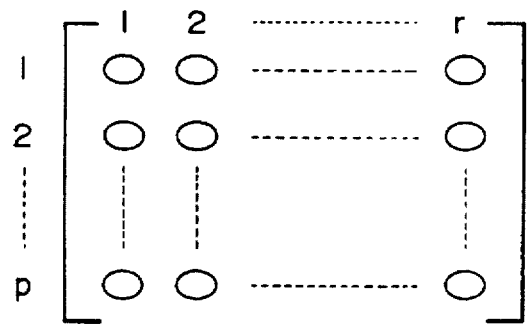

The number of $X_i$ for those areas 1, ..., k, ..., NT of $T_i \geq T_{mean}$ be $U_k^*$, and for those areas of $T_i < T_{mean}$ are $U_k^{**}$. Next, the value $MIN(U_k^*, U_k^{**})$ which is a smaller value of either $U_k^*$ or $U_k^{**}$, is obtained for each area on each of the two histograms, to obtain a histogram shown in FIG. 20B. This histogram is called an AND histogram in this specification. This AND histogram has three patterns as shown in FIGS. 21A, 21B, and 21C. The pattern of FIG. 21A shows that a derived input value can completely separate the derived output value from other output values. The pattern of FIG. 21B shows that a derived input value can separate the derived output value and values from other output values. The pattern of FIG. 21C shows that a derived input value has no correlation with the derived output value. In only the case of the pattern shown in FIG. 21C, a derived input value has no ability to classify the derived output value. This pattern is characterized in that the number of elements of the AND histogram is large and each element is distributed over the whole scale. Thus, a product value of the number of elements and the distribution of elements may be used as an index of the ability of the derived input to classify the output. A large product value corresponds to the AND histogram shown in FIG. 21C and is judged as having a poor classification ability. Let the product value be $D_{ij}$ (i=1, ..., p, where i is the data number of an input signal set, and j=1, ..., q, where j is the data number of an output signal set). Using the values $D_{ij}$ of each input signal and output signal, a table as shown in FIG. 22 can be formed. A proper threshold value $(D_{ij})$-th is set so that an input signal having two or more $D_{ij}$ values smaller than $(D_{ij})$-th is judged as an input signal not contributing to the output.

Next, the operation of step $T_3$ will be described. This embodiment uses as the index a ratio represented by a linear sum of other input signals. In this embodiment, as this ratio, a statistically obtained contribution factor $R^2$ is used which is defined by the following equations.

$$R^2 = 1 - (S_e/S_{yy}) \tag{34}$$

$$S_e = \sum_{i=1}^{N} (X_{ji} - \tilde{X}_{ji}) \tag{35}$$

$$S_{yy} = \sum_{i=1}^{N} (X_{ji} - \bar{X}_i) \tag{36}$$

$$\bar{X}_i = (1/N) \sum_{i=1}^{N} X_{ji} \tag{37}$$

where $X_{ji}$ represents a value of an i-th training data signal corresponding to a j-th input signal, where j=1, ..., P, and i=1, ..., N, $S_e$ represents a sum of squares of remaining differences, $S_{yy}$ represents a sum of squares, $\tilde{X}_{ji}$ represents an evaluated value corresponding to $X_{ji}$ when $X_{ij}$ is approximated using a linear equation of $X_1$, ..., $X_{j-1}$, $X_{j+1}$, ..., $X_p$, and $\bar{X}_j$ represents a mean value of $X_{ji}$.

An input signal having a maximum $R^2$ is judged as a most redundant input signal. As such a statistical value, instead of $R^2$, various other values may be used such as the value of a sum of squares of remaining differences.

Next, there will be described a method of deleting an input signal while checking the performance of the neural network calculating apparatus 102 so as not to lower the performance because of deleting the input signal. When the number of the input signal not contributing to an output is designated at step $T_2$, this number is transferred to the identifying apparatus 104. Next, at step $T_3$, the number of the input signal having the largest $R^2$ among the input signals other than the input signals deleted at step $T_2$ is informed to the identifying apparatus 104 via the data path 2. At step S1, the identifying apparatus 104 learns using the training data set consisting of an input signal set excluding the input signals having the numbers transferred at steps $T_2$ and $T_3$ and an output signal set. The resultant network is evaluated using the input and output evaluation signal sets read from the storage apparatus 103. In this embodiment, the output signal set responsive to the evaluation input signal set is compared with the outputs of the neural network calculation simulating apparatus 500 responsive to the training input signal set, and the comparison results are used as the recognition factor indicating the evaluation result. It is checked at step S2 if the degradation of the performance is within an allowable range, and thereafter at step S3 the input signal or signals in concern are determined to be deleted. The hidden neuron number optimizing apparatus 105 calculates the value $R^2$ of each input signal of the input signal set excluding the previously transferred input signal, and sends the number of the input signal having the maximum $R^2$ to the identifying apparatus 104 via the data path 2. Thereafter, the operations at steps S1 to S3 are repeated. If it is judged at step S2 that the degradation of the performance is out of the allowable range, then at step S4 the input signals deleted at the previous cycle are determined as capable of being deleted.

Figure 23:
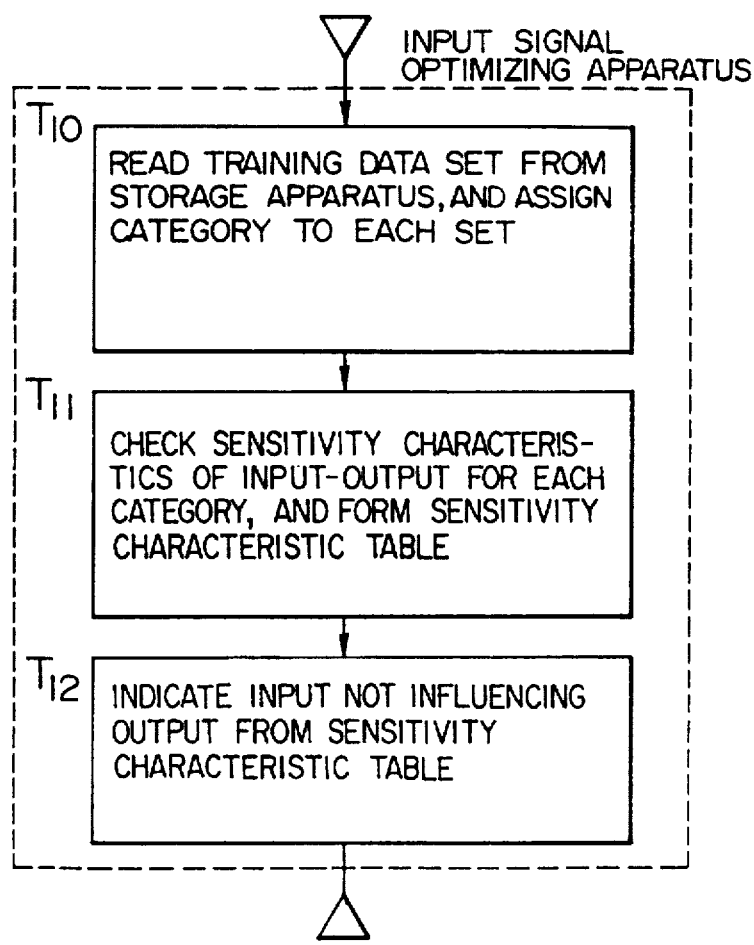
FIG. 23 is a diagram illustrating another embodiment of input signal optimizing means.

FIG. 23 shows another embodiment of the input signal optimizing apparatus T* of FIG. 19. This embodiment is based upon the following concept. Specifically, the neural network learns the pattern recognition rules from the training data (consisting of combinations of input and output signal sets) shown in FIG. 17. If a redundant input signal ($X_i$, $X_j$, ...; $1 \leq i, j, ... \leq p$) is not included in the input signal set ($X_1$, $X_2$, ..., $X_p$) shown in FIG. 17, then it can be considered that the input signal set does not influence the pattern recognition rules, i.e., the sensitivity of the output relative to an input change becomes low. In the embodiment shown in FIG. 23, in the learnt neural network, the sensitivity characteristics of the output relative to an input variation are analyzed to detect and delete a redundant input signal, to thereby select an optimum input signal set.

According to the embodiment, at step $T_{11}$ the input signal optimizing apparatus 106 reads a training data set of FIG. 17 (a combination of input and output signal sets) from the storage apparatus 103, and classifies it into a suitable category. As a method of classifying into a category, of N training data sets, the training data sets having the same output signal set $(T_1, T_2, \ldots, T_q)$ are grouped into the same category. For example, training data sets having the same output signal set $(0.99, 0.01, \ldots, 0.01)$ as the training data set No. 1 are selected from the training data sets No. 2 to No. N, and the selected training data sets are grouped into the 1st category. Next, training data sets having the same output signal set $(0.01, 0.09, \ldots, 0.01)$ as the training data set No. 2 are selected from the training data sets No. 3 to No. N, and the selected training data sets are grouped into the 2nd category. In the same manner, all training data sets are classified into proper categories. At step $T_{11}$, the value $X_i$ (i=1 to p) of the input signal set $(X_1, X_2, \ldots, X_p)$ is changed for each category classified at step $T_{10}$, and the outputs of the neural network is observed. For an input signal set other than for $X_i$, a representative value of each category is input. As such a representative value, there is used a mean value $X_{jmean}$ (j≠i, j=1 to p) of $X_j$ of a plurality of $n(C_m)$ input signal sets for each category, or an input signal set nearest to the mean value $X_{jmean}$ which is given by $$X_{jmean} = \sum_{k=1}^{n(C_m)} X_j/n(C_m)$$

where $n(C_m)$ represents the number of input signal sets used for learning a category $C_m$.

The outputs of the neural network observed at step $T_{11}$ include the outputs of an output neuron $C_m$ for recognizing the category $C_m$ and the outputs of the other output neurons. By changing the value of the input signal $X_i$, the outputs of the output neuron $C_m$ and the outputs of the other output neurons are graphed as shown in FIGS. 24A and 24B. This graph shows the input/output characteristics or sensitivity characteristics. As in the case of FIG. 24A, if the output values of the output neuron $C_m$ do not intersect with the output values of the neurons other than $C_m$, then the input $X_i$ does not influence the recognition, so that it is evaluated by a circle as shown in FIG. 25. On the other hand, as in the case of FIG. 24B, if the output values of the output neuron $C_m$ intersect with the output values of the neurons other than $C_m$, then the input $X_i$ influences the recognition, so that it is evaluated by a cross as shown in FIG. 25. FIG. 25 is a table with the evaluation results being indicated by circles and crosses, wherein the rows indicate the categories and the columns indicate the input signal sets. All input signals are changed for the category $C_m$ to check the sensitivity and enter circles and crosses. Thereafter, the sensitivity for another category is checked to enter circles and crosses to complete the table (sensitivity characteristic table) shown in FIG. 25.

Lastly, at step $T_{12}$ to FIG. 23, in accordance with the sensitivity characteristic table formed at step $T_{11}$, an input signal $X_i$ (i=1 to p) having the evaluation results indicated by circles for almost all categories is detected, and such an input signal is judged as capable of being deleted.

The number i of the input signal judged as capable of being deleted is transferred to the identifying apparatus 104 via the data path 1 or 2 shown in FIG. 19.

Similar to the above-described alternative embodiment of the input signal optimizing apparatus, learning is conducted using the training data set comprising the input signal set excluding the input signal having the signal number transferred at step $T_{12}$ and the output signal set. The recognition factor of the resultant neural network is evaluated. If the recognition factor is not lower than that before deleting the input signal, this input signal is determined to be deleted at step S3. If the recognition factor becomes lower, this input signal is given back to the input signal set, and the flow terminates. Thereafter, an input signal capable of being deleted next is requested via the data path 3 to the neural network optimizing design apparatus 105. The neural network optimizing design apparatus 105 forms the sensitivity characteristic table of the neural network learnt using the input signal set excluding the input signal capable of being deleted, to thereby check if there is an input signal capable of being deleted next. If there is an input signal capable of being deleted, the above procedure is repeated. If not, the operation is passed to the hidden neuron number optimizing apparatus 107.

Next, the method of determining an optimum number of hidden neurons at step T4 will be described.

The identifying apparatus 104 transfers, via the data path 4 to the neural network optimizing design apparatus 105, the outputs of respective neurons at the hidden neuron calculating apparatus 502, the outputs being obtained upon sequential input of an input signal set to the neural network calculation simulating apparatus 500 configured by using the input signals without no deleted input signals at step S4. The hidden neuron number optimizing apparatus 107 then statistically processes the outputs $Y_1$ to $Y_m$ corresponding to the input signal set, to determine an optimum number of neurons. In this embodiment, the linear relationship between output values of neurons for a given training data set is assumed as a duplicated calculation so that such neurons are omitted to optimize the number of neurons.

Figure 26:
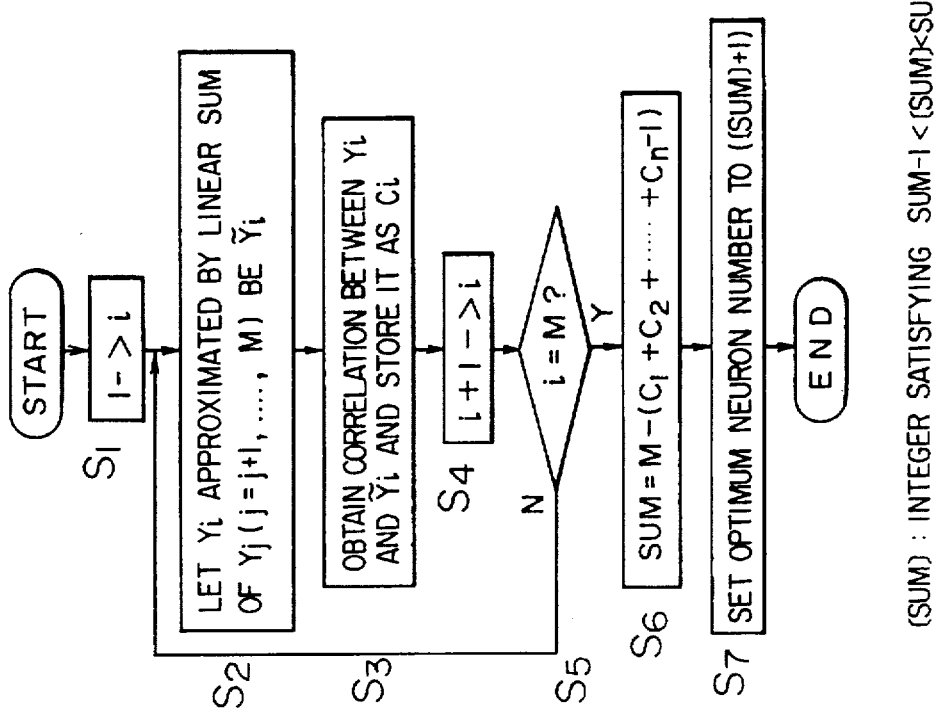
FIG. 26 illustrates an algorithm.

FIG. 26 shows the algorithm of optimizing the number of hidden neurons. First at step S1, the value i is set to 1. At step S2, using the values of $Y_1$ to $Y_m$ transferred at step S1, the value $Y_i$ is approximated by a linear sum of $Y_{i+1}$ to $Y_m$, which is given by $$\tilde{Y}_i = b_0 + b_{i+1}Y_{i+1} + \ldots, b_m Y_m \qquad (38)$$

An approximation equation can be obtained easily by using well known multiple regression analysis or the like. Next, as an index representative of the extent to which the value $Y_i$ can be described by a linear sum of $Y_{i+1}$ to $Y_m$, there is calculated and stored the absolute value $C_i$ of a multiple correlation coefficient between $Y_i$ and $\tilde{Y}_i$, the absolute value being obtained by the following equations.

$$C_i = |M_{ii}|/\sqrt{S_{ii}\tilde{S}_{ii}} \qquad (39)$$

$$M_{ij} = \sum_{j=1}^{N}(Y_{ij}\tilde{Y}_{ij}) - \left(\sum Y_{ij}\sum_{j=1}^{N}\tilde{Y}_{ij}\right)/N \qquad (40)$$

$$S_{ij} = \sum_{j=1}^{N}\left(Y_{ij}^2 - \left(\sum_{i=1}^{N}Y_{ij}\right)^2\right)/N \qquad (41)$$

$$\tilde{S}_{ij} = \sum_{j=1}^{N}\tilde{Y}_{ij}^2 - \left(\sum_{j=1}^{N}\tilde{Y}_{ij}\right)^2/N \qquad (42)$$

where

N is the number of training data sets, $Y_{ij}$ is the output of the i-th hidden layer upon input of the j-th input signal of the training data set, and $\tilde{Y}_{ij}$ is the value-given by the equation (38) upon input of the j-th input signal of the training data set.

$C_i$ takes a value from "0" to "1". When $C_i$ is "1", it means that the value $Y_i$ can be completely described as a linear sum of $Y_{i+1}$ to $Y_m$. When $C_i$ is "0" the value $Y_i$ is not correlated at all with the values $Y_{i+1}$ to $Y_m$. At step S4, the value i is equal to the number m of neurons at the hidden neuron calculating apparatus 502. If not, the steps S2 to S4 are repeated. If equal, at step S6 the value SUM is calculated and used as the optimum number which is given by $$SUM = m - (C_1 + C_2 +, \ldots, + C_{m-1}) \quad (43)$$

Since the number of neurons takes an integer number, the value SUM is changed to an integer at step S7. The number of neurons thus determined is sent to the identifying apparatus 104 via the data path 5.

In this embodiment, as a method of quantitatively deriving a linear relation of output values of neurons, the statistically obtained contribution factor and multiple correlation coefficient has been considered. Another algorithm is also applicable by considering other statistic output values of neurons such as variance. Instead of a statistic value, an evaluated value of the weights $W_i$ of synapses may also be used. Also in this embodiment, in evaluating the duplicated function portion of outputs of neurons, the linear and nonlinear relations between outputs have been considered. Instead, the duplicated function portion may be evaluated using other components. Furthermore, although the neural network optimizing design apparatus 105 is constructed of the input signal optimizing apparatus 106 and the hidden neuron number optimizing apparatus 107, it may be constructed of one of the two apparatuses 105 and 106 if desired. If the input signal optimizing apparatus 106 is omitted, the processes S1 to S4 of the identifying apparatus 104 shown in FIG. 19 can be omitted. If the hidden neuron number optimizing apparatus 107 is omitted, the steps S5 to S6 can be omitted. Still further, in this embodiment, although the input signal optimizing apparatus 106 is provided with a function to sequentially designate an unnecessary input signal, the number of input signals may be reduced by properly synthesizing them basing upon the contents thereof. The means shown in FIG. 14 may be mounted integrally on the same apparatus, or may be used as discrete apparatus while data transferring therebetween via communication networks or the like. The neural network calculation simulating apparatus 500 installed with the identifying apparatus 104 may be omitted as desired, by commonly using the neural network calculating apparatus 102 for such an identification purpose.

Figure 27:
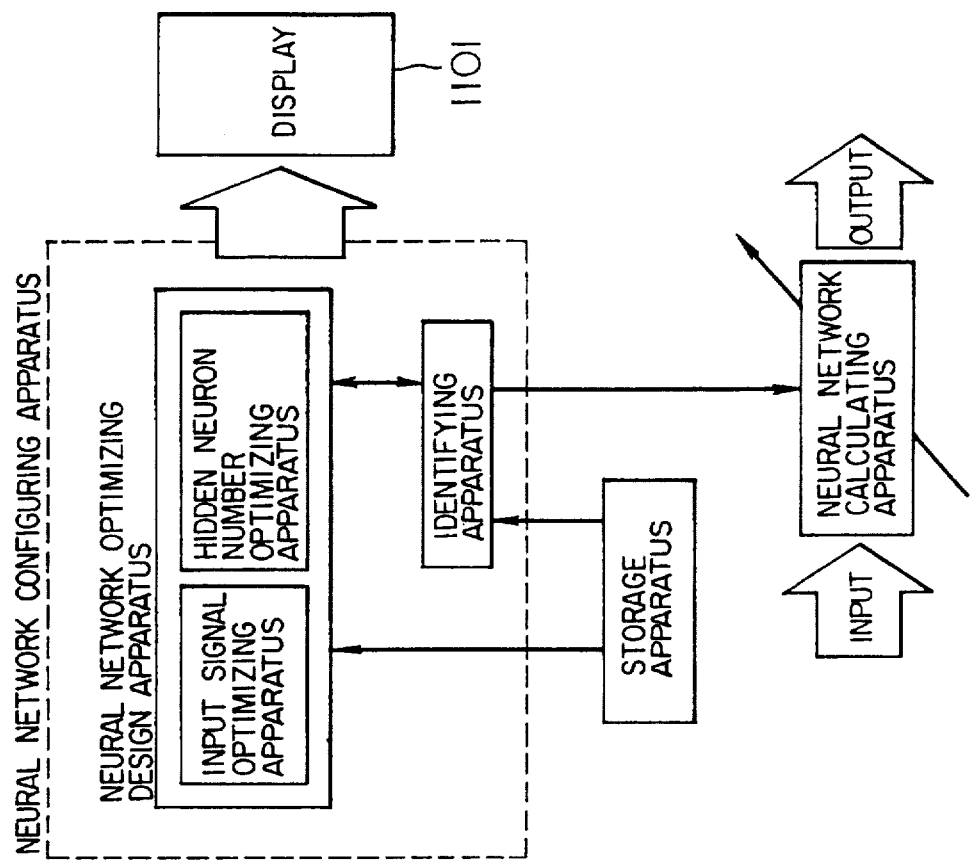
FIG. 27 shows the configuration.

Another embodiment is shown in FIG. 27 wherein there is provided a display apparatus 1101 for informing a user of the operation of the neural network optimizing design apparatus 105. In the display apparatus 1101, there are displayed on a display the number of an input signal excluded by the input signal optimizing apparatus 106, and the number of neurons at the hidden neuron calculating apparatus 202 determined by the hidden neuron number optimizing apparatus 107. The state of learning advancement or the like may be displayed.

Figure 28:
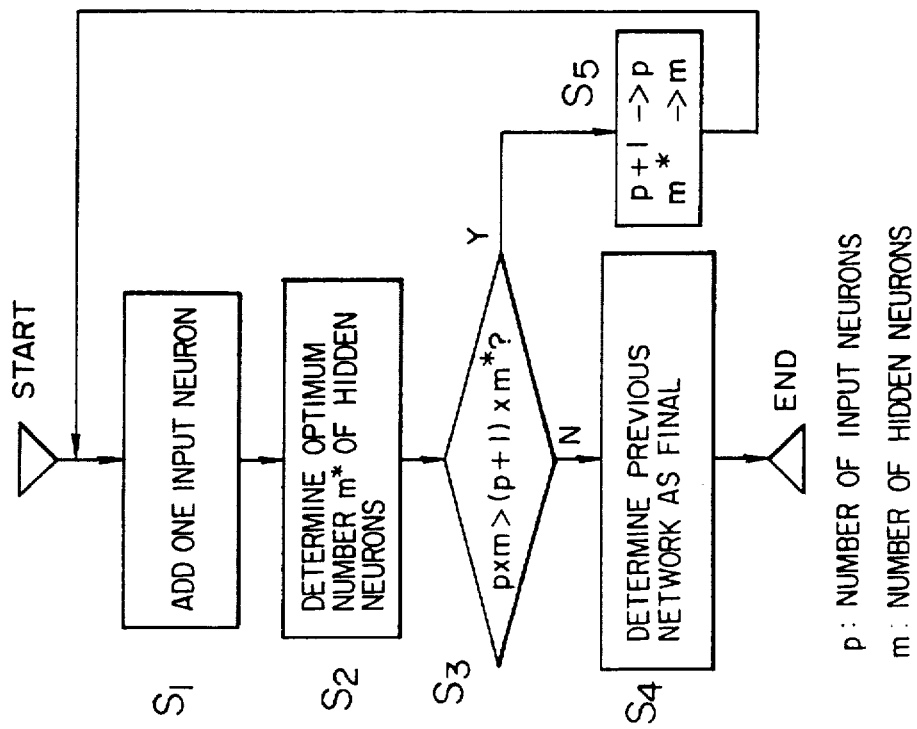
FIG. 28 is a diagram showing an embodiment wherein a neural network is configured with minimum calculation amount.

As another embodiment of the present invention, there will be described a method of designing a network which requires a minimum calculation amount. FIG. 28 illustrates an algorithm realizing such a method. In this embodiment, the configuration of a network (p input neurons and m hidden neurons) once properly configured is again optimized from the stand-point of minimizing the calculation amount. Therefore, this algorithm is executed, for example, after step S5 shown in FIG. 19. Referring to FIG. 28, at step S1 an input parameter is added for a new input neuron. At step S2, the optimum number m, of hidden neurons is determined under such a condition. The optimum number is calculated by the algorithm shown in FIG. 26. Next, at step S3, the product of p and m and the product of (p+1) and m* are compared with each other. If p×m>(p+1) × m*, the product of input and hidden neurons is reduced and so the number of synapses between them can be reduced. In this case, at step S5 (p+1) is set to p, and m, is set to m, and thereafter the flow returns to step S1 to repeat the above procedure. If not p×m>(p+1)×m* at step S3, it is not possible to further minimize the calculation amount, and the network with p input neurons and m output neurons is determined as the final configuration.

In this embodiment, the product of input neurons and hidden neurons is minimized. In addition to this, the product of input, hidden, and output neurons may be minimized.

Figure 29:
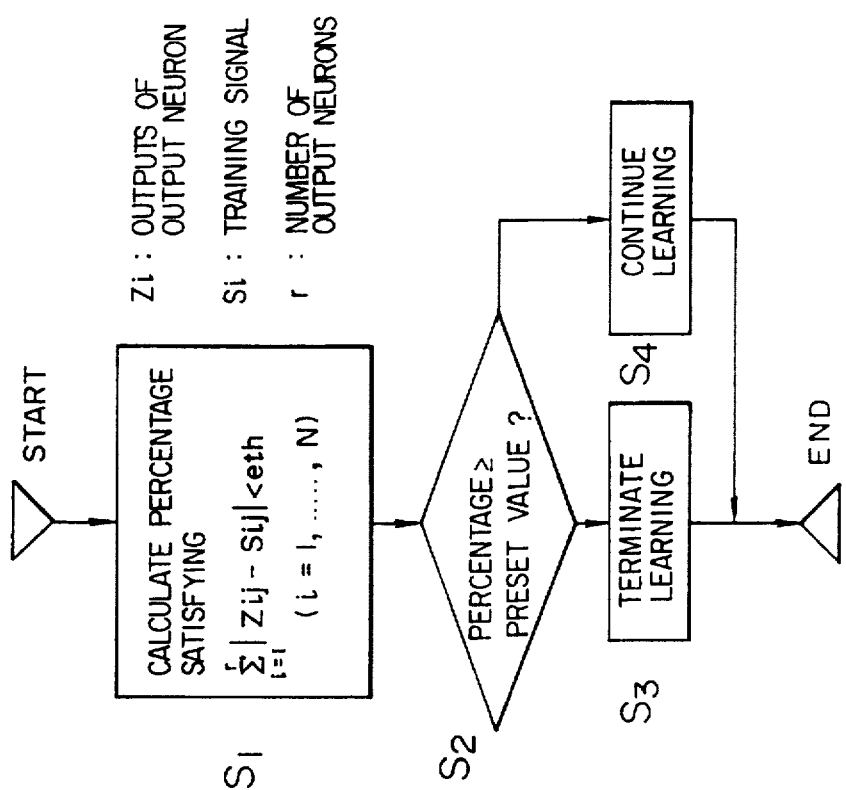
FIG. 29 is a diagram showing an embodiment wherein a neural network is configured with high learning accuracy.

As a still further embodiment of the present invention, FIG. 29 shows a method of terminating learning when a learning accuracy given by a user is obtained. In learning by using N training samples, it is checked at step S1 if the difference (errors) between present output values and those for each training sample, respectively at output neurons, are within a predetermined range ($e_{th}$) or not. Then, the percentage of training samples satisfying $$\sum_{j=1}^{r} |Z_{ij} - S_{ij}| < e_{th}$$

relative to the n training samples is calculated. At step S2 it is checked if the calculated percentage is equal to or smaller than the value designated by a user. If not, the learning is terminated at step S3. If the percentage is equal to or smaller than the designated value, the learning continues at step S4. This algorithm is executed during learning at a proper timing (e.g. at a timing when the calculation cycle for N training samples is completed, since learning is regressively performed in an ordinary case), to judge the termination or continuation of learning.

As another embodiment of the present invention, a method of designing a network when a learning time is designated as a condition as illustrated in FIG. 1. In this embodiment, there is used as a learning algorithm a back propagation algorithm (described, for example, in "Neural Computer", by Kazuyuki AIHARA, Tokyo Denki College Publication Department, pp. 110 to 113). However the present invention is not limited only to the back propagation algorithm.

With the back propagation algorithm, the time T required for modifying the weight of one synapse connection is uniquely determined by an apparatus (hardware or software) for executing this algorithm. The time required for modifying once the weights of all synapse connections from the output side to the input side is proportional to the total number (hereinafter called a total connection number) of synapses of the neural network.

Therefore, the learning time LT of a neural network is given by the following equation, using the number (called a learning number) of weight modifications from the output side to the input side and the total connection number.

$$LT = T \times (\text{total connection number}) \times (\text{learning number}) \quad (44)$$

Figure 31:
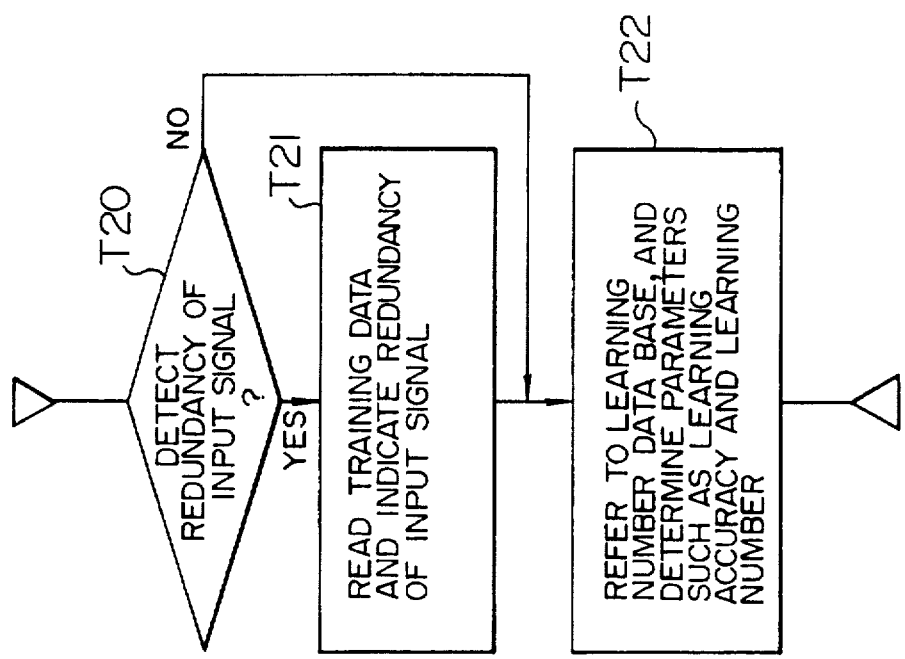
Figure 30:
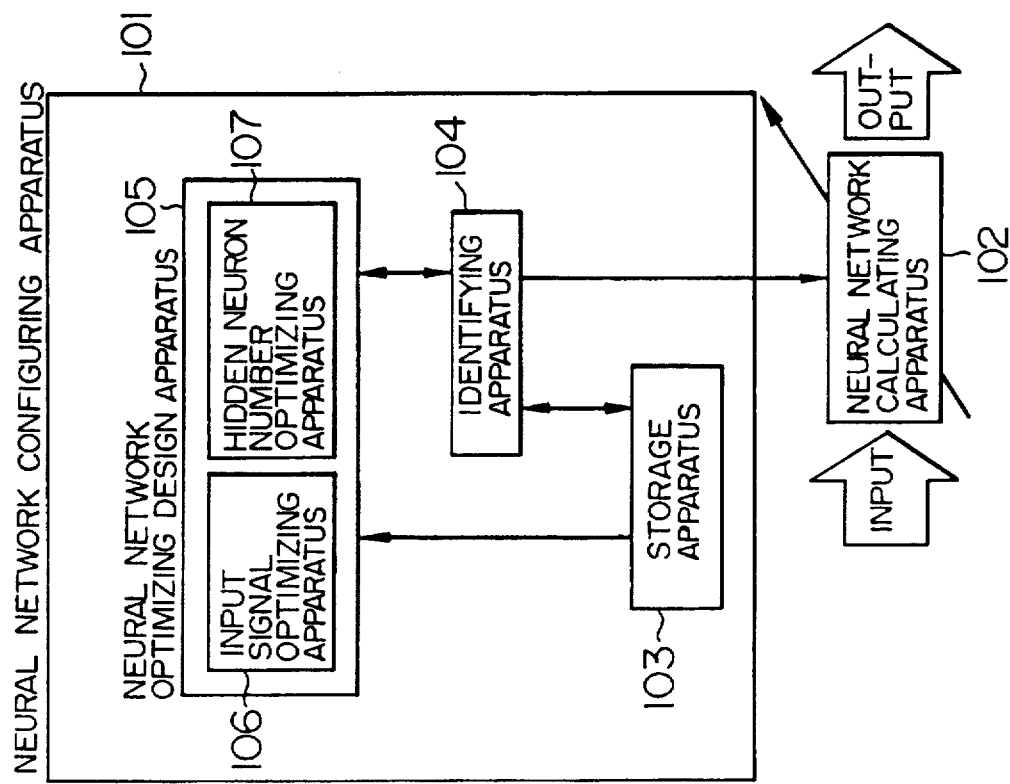
FIG. 30 is a diagram showing an embodiment wherein a neural network is configured within a designated calculation time period.

If the learning time LT is designated, the total connection number and learning number are determined so as to satisfy LT, since the weight modifying time t is known. As a strategy of determining the total connection number and learning number, it can be considered that both values be selected as small as possible. FIG. 30 shows the configuration of the apparatus realizing this embodiment. FIG. 31 shows the algorithm to be executed by the apparatus shown in FIG. 30. The configuration of the apparatus shown in FIG. 30 is almost the same as that shown in FIG. 14, except that the apparatus of FIG. 30 supplies a signal from the identifying apparatus 104 to the storage apparatus 103. The operation of the apparatus of FIG. 30 will be described with reference to the algorithm shown in FIG. 31. The algorithm of FIG. 31 is executed by the identifying apparatus 104, and includes steps T20, T21 and T22. At step T21 a smaller total connection number is selected. To this end, it is checked if there is a redundant input signal. As an apparatus for detecting a redundant input signal, step T3 of the input signal optimizing apparatus shown in FIG. 19 may be used. If it is already known that there is no redundant input signal, an operator designates not to execute step T20 when designating the learning time LT.

Next, at step T22, the learning number is reduced. The parameters determining the learning number include: the learning accuracy, the number of training data sets, the initial values of weights, the learning constant (n) and stabilization constant (a) of the weight modifying equation, and the like. There is presently no equation defining the relation between these parameters and the learning number. In view of this, the identifying apparatus 104 causes a learning number database as shown in FIG. 32 to be stored in the storage apparatus 103 as the relation between these parameters and the learning numbers.

After the total connection number is determined at step S21, the learning number can be determined from the equation (44). Then, the identifying apparatus 104 reads the learning number database from the storage apparatus 103, to retrieve the learning number near that obtained from the equation (44). If there is a learning number near that obtained from the equation (44), the corresponding parameters such as the learning accuracy and the number of training data sets are selected to conduct learning by using the neural network calculating apparatus 102. In this case, however, there occurs a case where the number of training data sets stored in the storage apparatus 103 does not coincide with the number of training data sets in the database. If the number of training data sets stored in the storage apparatus 103 is smaller than that stored in the database, then it is necessary to select also the presently used training data sets. This selection method may be a method of randomly deriving presently used training data sets so as to have almost the same number for each category, a method of deriving presently used training data sets proportionally to the distribution thereof for each category, or other methods.

If there is no learning number near that obtained from the equation (44), the parameters such as the learning accuracy and the number of training data sets are determined through estimation basing on the contents of the learning number database. If there is a difference in number of training data sets, one of the above-described methods is used to also select presently used training data sets.

It is apparent that each time learning is conducted using the apparatus of this embodiment, the parameter data in the data base shown in FIG. 32 is updated or added.

It is possible to enter in the data base of FIG. 32 the learning time required for configuring a neural network and a scale thereof such as the total number of synapse connections. In this case, using the learning time designated as a condition, the database is directly referred to for estimating the parameters necessary for learning.

Figure 33:
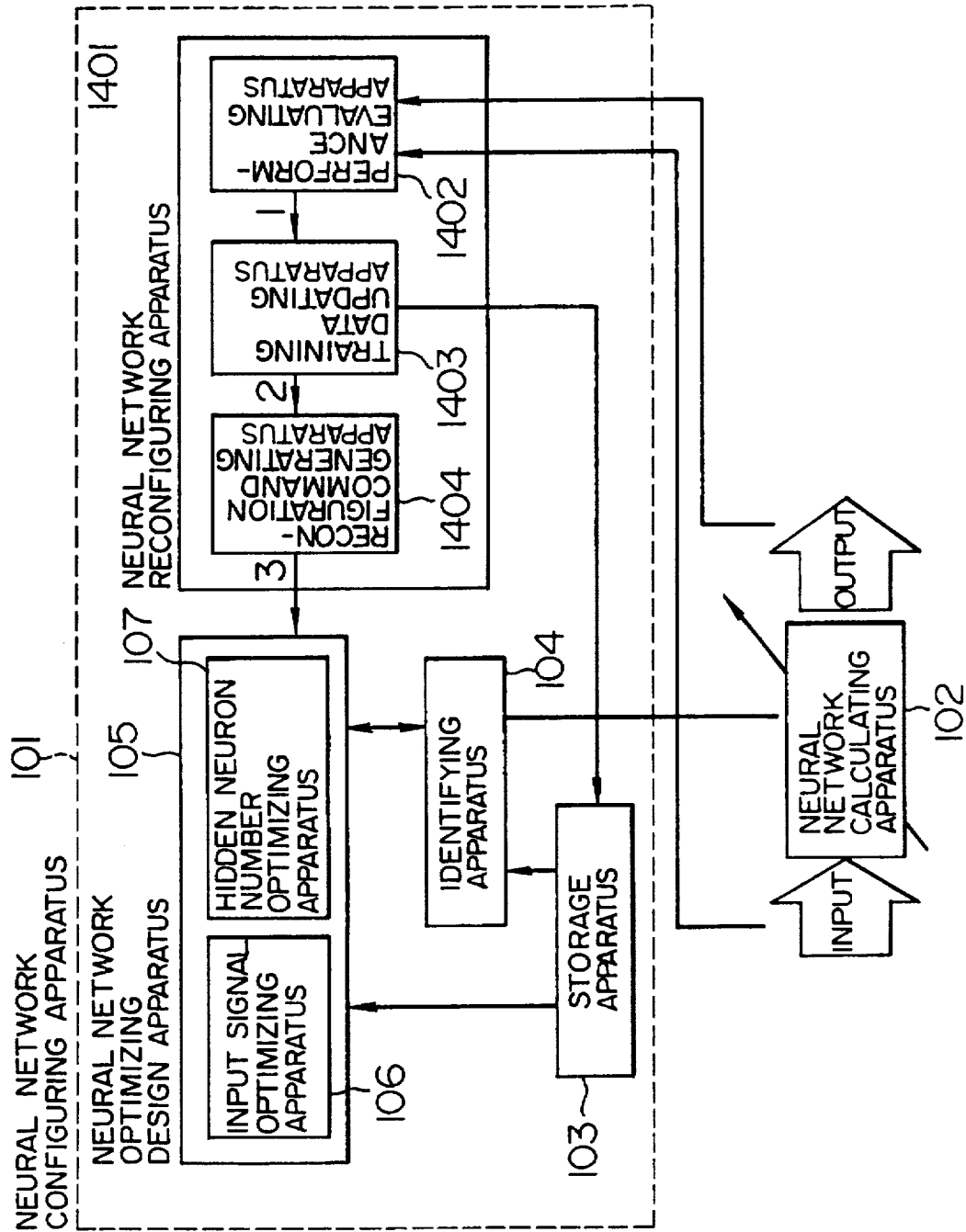
FIG. 33 is a diagram showing an embodiment wherein a neural network is reconfigured.

Another embodiment of the present invention is shown in FIG. 33 wherein the neural network configuring apparatus 101 is provided with a neural network reconfiguring means for reconfiguring the neural network calculating apparatus 102 if the performance thereof is not sufficient. The neural network reconfiguring apparatus 1401 is constructed of a performance evaluating apparatus 1402, a training data updating apparatus 1403, and a reconfiguring command generating apparatus 1404. The performance evaluating apparatus 1402 receives the inputs to the neural network calculating apparatus 102 and the corresponding calculated outputs, and evaluates if the desired outputs for the inputs have been obtained or not. This evaluation can be readily performed by detecting the differences between the desired output values provided by a user and the outputs of the neural network calculating apparatus 102. If the evaluation results do not satisfy a desired level, the performance evaluating apparatus 1402 drives the training data updating apparatus 1403 by supplying a signal 1 so that combinations of inputs which showed large differences, and the corresponding desired outputs, are added to thereby update the contents of the storage apparatus 103. In such a case, the inputs already stored in the storage apparatus 103 having the values near the newly added inputs, and the corresponding outputs, may be deleted. Thereafter, a signal 2 representative of a completion of updating the storage apparatus 103 is sent to the reconfiguration command generating apparatus 1404. Then the reconfiguration command generating apparatus 1404 sends a signal 3 to the neural network optimizing design apparatus 105 to again activate the latter. The neural network optimizing design means 105 again performs the procedure described previously to optimize the configuration of the neural network calculating apparatus 102.

Figure 34:
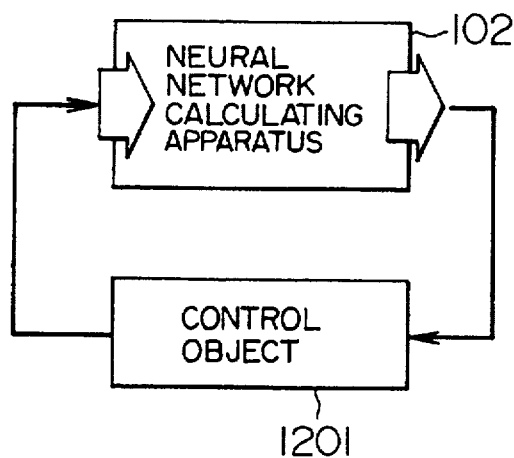
FIGS. 34 to 37 are diagrams showing the structure of a system to which the present invention is applied.

Next, examples of various systems having the neural network calculating apparatus 102 of the present invention are given. FIG. 34 shows an example wherein the apparatus of this invention is set within the control loop of a control system. The neural network calculating apparatus 102 receives a feedback signal from an object 1201 to be controlled, and outputs a control signal to the object 1201.

Figure 35:
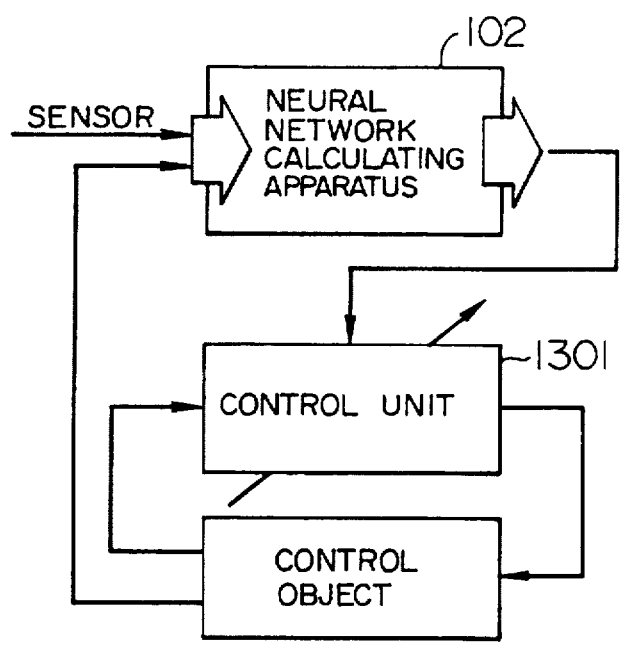

FIG. 35 shows an example wherein the neural network calculating apparatus 102 is used as a tuning means for a control system 1301. The neural network calculating apparatus 102 receives a feedback signal from an object 1201 to be controlled and other signals from sensors, and outputs signals representative of optimum control specifications and constants to each part of the system 1301.

Figure 36:
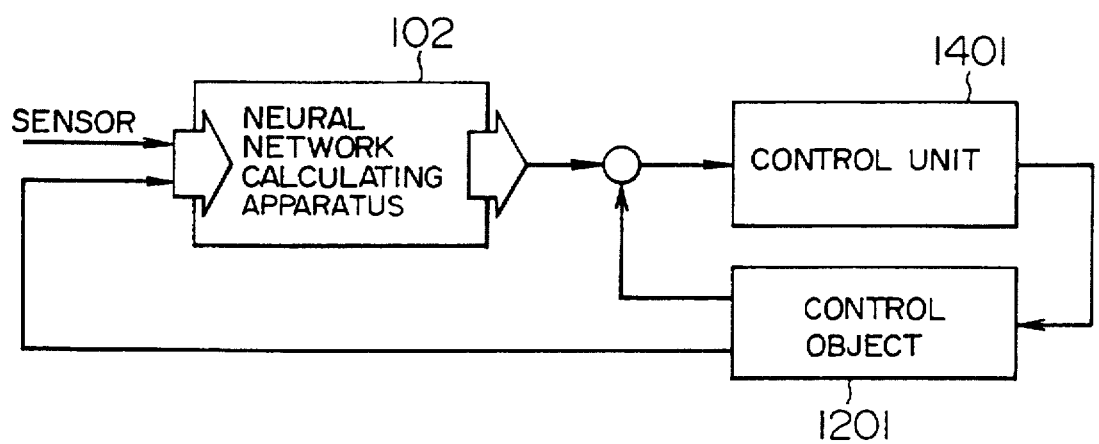

FIG. 36 shows an example wherein the neural network calculating apparatus 102 is used for generating a target value for an object 1201 to be controlled. The neural network calculating apparatus 102 receives a feedback signal from the object 1201 and other signals from sensors, and outputs a target value for the object 1201. This target value is compared with the feedback signal from the object 1201, and a value corresponding to the difference therebetween is input to a controller 1401 which in turn calculates the input value to output a signal necessary for the object 1201. The comparison of the target value with the feedback signal may be omitted if desired, and instead a feed forward control may be used.

The objects to be controlled include such as a mill, and a power plant.

Figure 37:
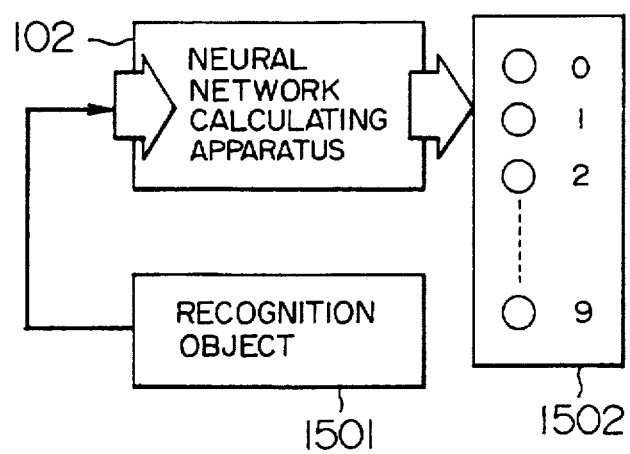
Figure 38:
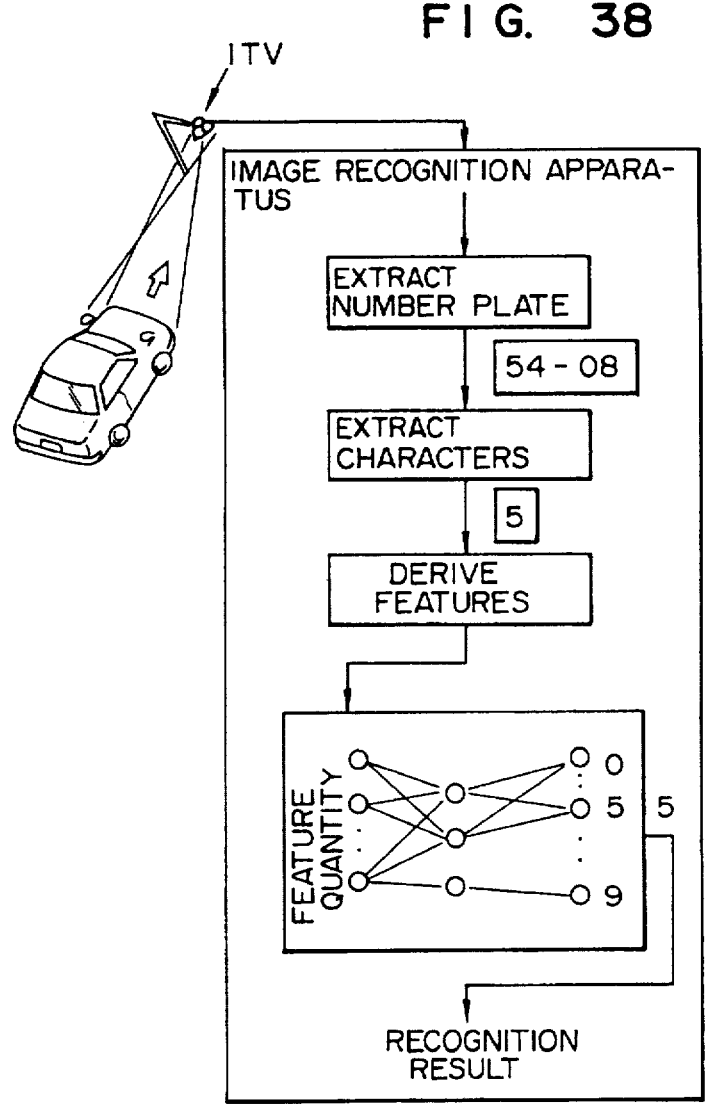
FIG. 38 is a diagram showing an example of car number recognition to which the present invention is applied.

FIG. 37 shows an embodiment applied to a recognition apparatus. The neural network calculating apparatus 102 receives information from an object 1501 to be recognized, and outputs the recognized result. The object 1501 to be recognized includes: number, character, voice, facial features, gender, object color and console, and other various subjects. The recognized result of a numeral for example may be indicated on a recognized result display apparatus 1502 by turning on a lamp, or may be indicated on a display or using a voice output apparatus.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

We claim:

1. An apparatus for configuring a multi-layered neural network comprising:

neurons in each layer of the multi-layered configuration and synapses connecting said neurons between the layers for storing input/output training data sets, each including input data signals and corresponding desired output data signals; and means for optimizing said neural network in accordance with said training data sets to satisfy given conditions which include a designated learning time period, an optimized neural network scale and minimized erroneous operations for input data other than said training data sets.

2. An apparatus for configuring a neural network according to claim 1, further comprising means for setting weights between input and hidden neurons to separate input patterns of different classes, in order to configure a pattern recognition network having an optimized neural network scale.

3. An apparatus for configuring a neural network according to claim 2, further comprising means for solving inequalities expressing the relationship of said weights between hidden and output neurons.

4. An apparatus for configuring a neural network according to claim 2, further comprising neural network optimizing design means for optimizing the design of said neural network.

5. An apparatus for configuring a neural network according to claim 4, wherein said neural network optimizing design means comprises hidden neuron number optimizing means for setting an optimum number of said hidden neurons.

6. An apparatus for configuring a neural network according to claim 5, wherein said hidden neuron number optimizing means operates to sequentially input said input data signals to said neural network which has stored said relative input/output training data sets to obtain the outputs of said hidden neurons, and in accordance with the analysis results of said outputs, to determine the number of said hidden neurons.

7. An apparatus for configuring a network according to claim 5, wherein said neural network optimizing designing means comprises said input data signal optimizing means and said hidden neuron number optimizing means, and said hidden neuron number optimizing means optimizes the number of said hidden neurons in accordance with said input data signals determined by said input data signal optimizing means.

8. An apparatus for configuring a neural network according to claim 4, wherein said neural network optimizing design means minimizes a product of the number of said input neurons and the number of said hidden neurons.

9. An apparatus for configuring a neural network according to claim 1, further comprising means for satisfying said given condition by minimizing the number of said neurons.

10. An apparatus for configuring a neural network according to claim 1, further comprising means for satisfying said given condition by minimizing the number of input neurons.

11. An apparatus for configuring a neural network according to claim 1, further comprising means for satisfying said given condition by minimizing the number of hidden neurons among hidden layers of said multi-layered neural network.

12. An apparatus for configuring a neural network according to claim 1, further comprising input data signal optimizing means for detecting an input data signal which has the least influence upon the performance of said network, from said input data signals, and setting the number of input neurons to the number obtained by subtracting the number of said detected input data signals from the number of said input data signals.

13. An apparatus for configuring a neural network according to claim 12, wherein said input data signal optimizing means includes means for evaluating the correlation between said input data signal and said output data signals and identifying an input data signal which does not contribute to a determination of an output data signal, and further means for evaluating the linear relationship between said input data signals and identifying an input data signal as a redundant input signal which can be linearly approximated by other input data signals.

14. An apparatus for configuring a neural network according to claim 12, wherein said input data signal optimizing means includes means for determining said output data signals while changing the value of each input data signal and identifying an input data signal which does not influence said output data signals.

15. An apparatus for configuring a neural network according to claim 12, wherein said training data sets and combinations of said input and output data signals used for the training of said neural network are prepared, a relationship between said input and output data signals set by said input data signal optimizing means is stored in said neural network, and in accordance with an evaluation result of said neural network, said input data signal optimizing means further detects an input data signal having least influence upon the performance of said network to determine the number of input neurons and deletes said input data signal having least influence upon the performance of said network.

16. An apparatus for configuring a neural network according to claim 1, further comprising means for terminating the learning of said neural network within a designated learning time period.

17. An apparatus for configuring a neural network according to claim 16, further comprising means for determining the number of input data signals and the number of learning cycles so as to terminate the learning within said designated learning time period.

18. An apparatus for configuring a neural network according to claim 1, further comprising means for minimizing the output errors for input data signals other than said training data set.

19. An apparatus for configuring a neural network according to claim 18, further comprising means for setting the weights between input and hidden neurons so as to separate input patterns, while satisfying said condition of minimizing said output errors.

20. An apparatus for configuring a neural network according to claim 1, wherein said means for optimizing said scale of said network includes means for minimizing the number of input neurons, hidden neurons and product of the number of input neurons and hidden neurons.

* * * * *